US012641678B2

(12) United States Patent
Huang et al.

(10) Patent No.: US 12,641,678 B2
(45) Date of Patent: May 26, 2026

(54) MULTIMODE DISCONTINUOUS RECEPTION IN ORBITAL ANGULAR MOMENTUM COMMUNICATIONS

(71) Applicant: QUALCOMM INCORPORATED, San Diego, CA (US)

(72) Inventors: Min Huang, Beijing (CN); Chao Wei, Beijing (CN); Hao Xu, Beijing (CN); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 18/685,850

(22) PCT Filed: Oct. 14, 2021

(86) PCT No.: PCT/CN2021/123758
§ 371 (c)(1),
(2) Date: Feb. 22, 2024

(87) PCT Pub. No.: WO2023/060500
PCT Pub. Date: Apr. 20, 2023

(65) Prior Publication Data
US 2024/0357703 A1 Oct. 24, 2024

(51) Int. Cl.
H04W 76/28 (2018.01)
H04B 7/06 (2006.01)
(Continued)

(52) U.S. Cl.
CPC .......... H04W 76/28 (2018.02); H04B 7/0617 (2013.01); H04B 7/0697 (2013.01);
(Continued)

(58) Field of Classification Search
CPC ..... H04W 76/15; H04W 76/28; H04B 7/0697
See application file for complete search history.

(56) References Cited

U.S. PATENT DOCUMENTS

| 10,205,591 B2 * | 2/2019 | Djordjevic | ........... H04B 10/516 |
| 11,336,008 B2 * | 5/2022 | Hirabe | ..................... H01Q 3/16 |

(Continued)

FOREIGN PATENT DOCUMENTS

| CN | 106341873 A | 1/2017 |
| CN | 110138438 A | 8/2019 |

(Continued)

OTHER PUBLICATIONS

Supplementary European Search Report—EP219602380—Search Authority—The Hague—May 28, 2025 (2106538EP).

(Continued)

*Primary Examiner* — Brendan Y Higa
(74) *Attorney, Agent, or Firm* — QUALCOMM Incorporated

(57) ABSTRACT

Methods, systems, and devices for wireless communications are described. A first device may select, from multiple orbital angular momentum (OAM) modes, a set of one or more primary OAM modes and a set of one or more secondary OAM modes, where at least one primary OAM mode is activated periodically and at least one secondary OAM mode is activated based on a trigger. The first device may transmit, to a second device, a message indicating a configuration for the selected set of one or more primary OAM modes, the selected set of one or more secondary OAM modes, and discontinuous reception (DRX) parameters for each of the sets of OAM modes. The second device may monitor for a signal using a primary OAM mode using the DRX parameters for the set of primary OAM modes, and the second device may activate a second OAM mode based on receiving the signal.

30 Claims, 20 Drawing Sheets

(51) Int. Cl.
    *H04B 7/08*          (2006.01)
    *H04W 16/28*       (2009.01)
    *H04W 76/15*       (2018.01)

(52) U.S. Cl.
    CPC ............ *H04B 7/088* (2013.01); *H04W 16/28*
    (2013.01); *H04W 76/15* (2018.02)

(56)            References Cited

U.S. PATENT DOCUMENTS

| | | | | |
|---|---|---|---|---|
| 11,804,889 | B2 * | 10/2023 | Alavi | H04B 7/0697 |
| 2017/0117626 | A1 * | 4/2017 | Sajuyigbe | H01Q 1/523 |
| 2017/0170574 | A1 * | 6/2017 | Sacco | H01Q 21/205 |
| 2017/0187442 | A1 * | 6/2017 | Luddy | H04J 11/00 |
| 2019/0181932 | A1 | 6/2019 | Jayawardene et al. | |
| 2019/0334609 | A1 * | 10/2019 | Alavi | H01Q 3/34 |
| 2020/0296599 | A1 * | 9/2020 | Sasaki | H04B 7/0469 |
| 2021/0234592 | A1 * | 7/2021 | Ashrafi | H01Q 21/065 |
| 2021/0235486 | A1 | 7/2021 | Atefi | |
| 2022/0278723 | A1 * | 9/2022 | Yu | H04B 7/0617 |
| 2023/0096819 | A1 * | 3/2023 | Ni | H04B 7/0639 |
| | | | | 343/702 |
| 2025/0365044 | A1 * | 11/2025 | Cheema | H04B 7/0695 |

FOREIGN PATENT DOCUMENTS

| | | | |
|---|---|---|---|
| CN | 111294896 A | 6/2020 | |
| CN | 112217718 A | 1/2021 | |
| WO | WO-2020186092 A2 | 9/2020 | |
| WO | WO-2021096225 A1 | 5/2021 | |

OTHER PUBLICATIONS

International Search Report and Written Opinion—PCT/CN2021/123758—ISA/EPO—Jul. 7, 2022 (2106538WO1).

\* cited by examiner

Figure 16:
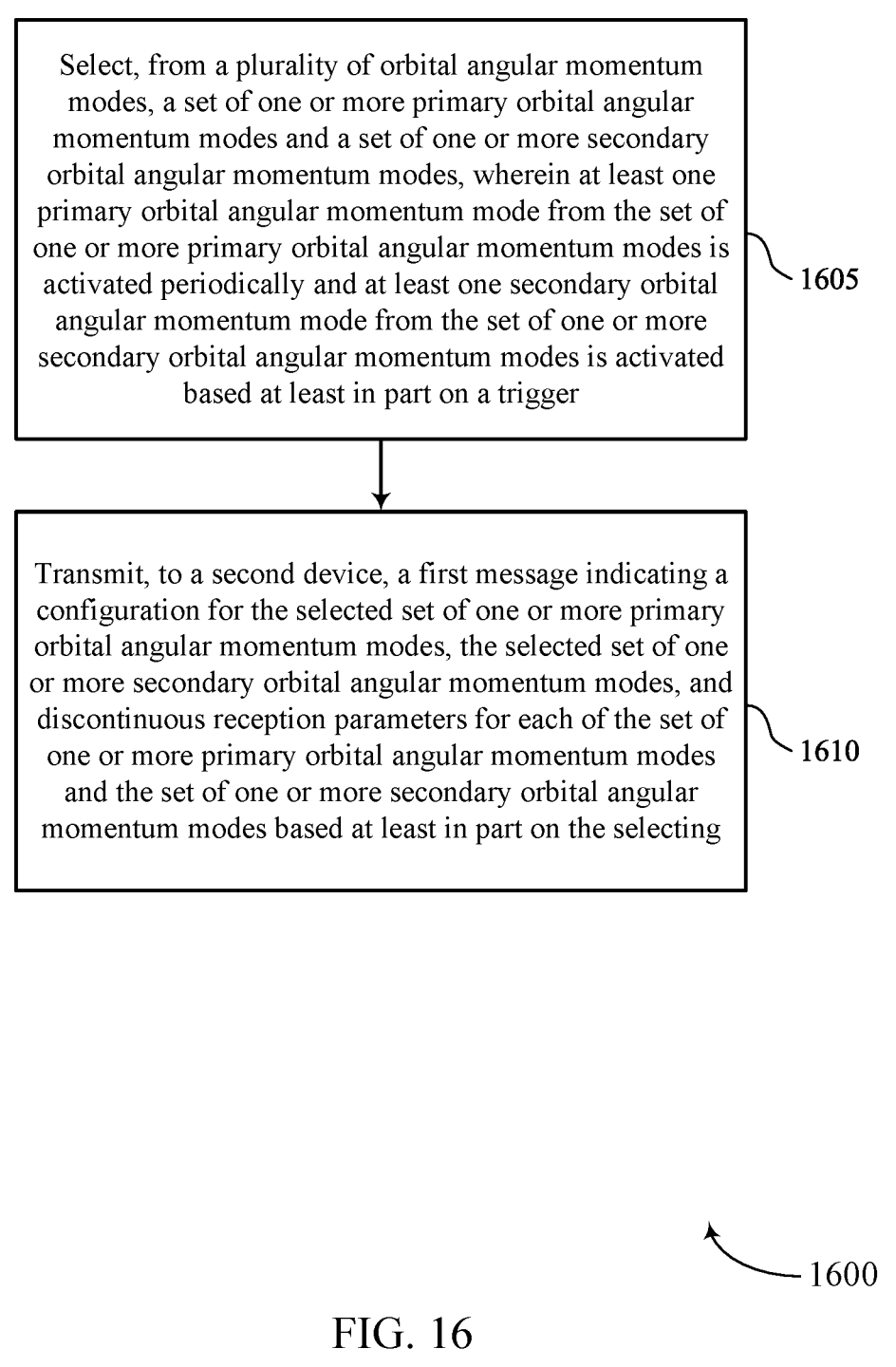

Select, from a plurality of orbital angular momentum modes, a set of one or more primary orbital angular momentum modes and a set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger

1605

Transmit, to a second device, a first message indicating a configuration for the selected set of one or more primary orbital angular momentum modes, the selected set of one or more secondary orbital angular momentum modes, and discontinuous reception parameters for each of the set of one or more primary orbital angular momentum modes and the set of one or more secondary orbital angular momentum modes based at least in part on the selecting

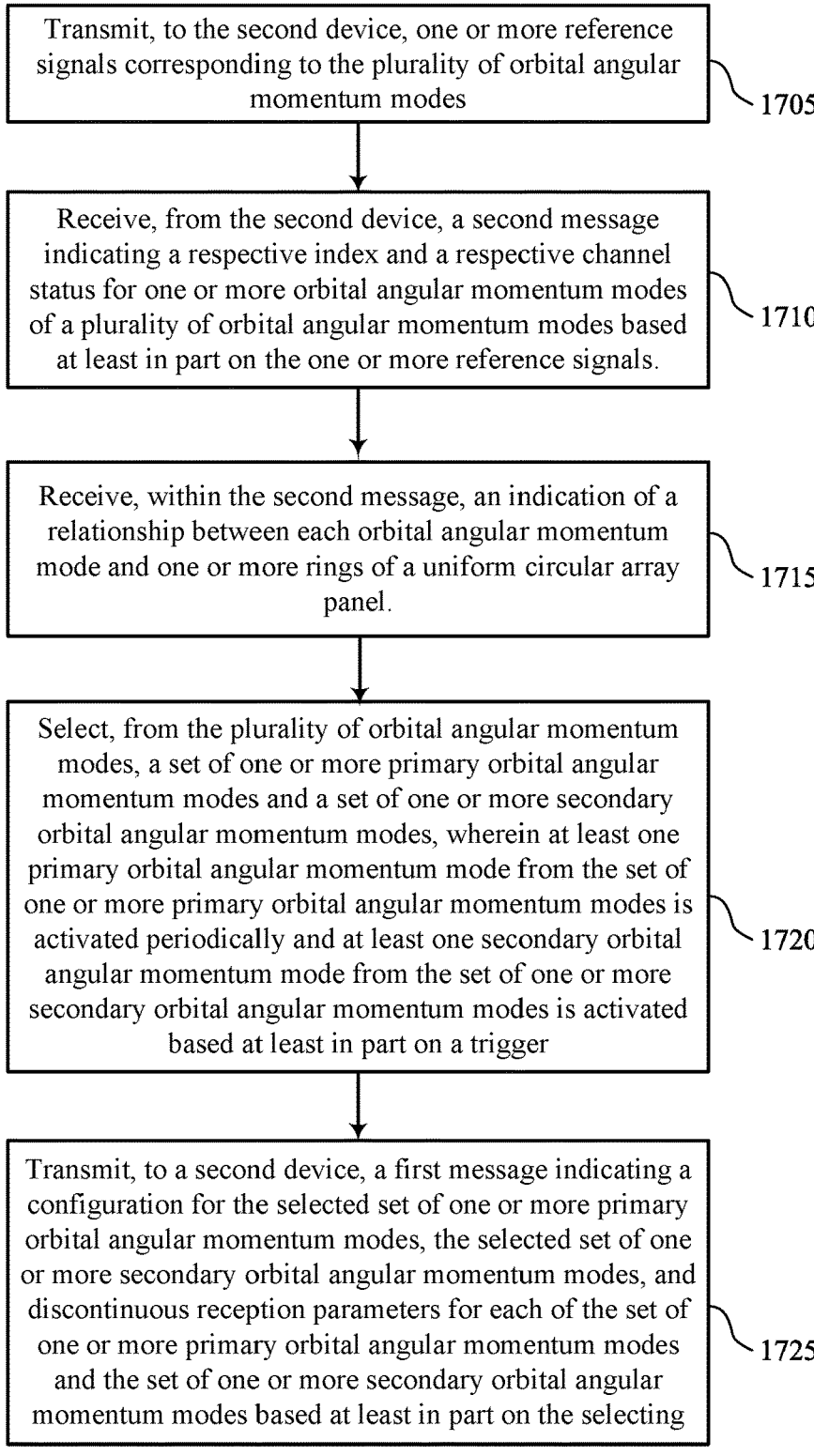

Transmit, to the second device, one or more reference signals corresponding to the plurality of orbital angular momentum modes

1705

Receive, from the second device, a second message indicating a respective index and a respective channel status for one or more orbital angular momentum modes of a plurality of orbital angular momentum modes based at least in part on the one or more reference signals.

1710

Receive, within the second message, an indication of a relationship between each orbital angular momentum mode and one or more rings of a uniform circular array panel.

1715

Select, from the plurality of orbital angular momentum modes, a set of one or more primary orbital angular momentum modes and a set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger

1720

Transmit, to a second device, a first message indicating a configuration for the selected set of one or more primary orbital angular momentum modes, the selected set of one or more secondary orbital angular momentum modes, and discontinuous reception parameters for each of the set of one or more primary orbital angular momentum modes and the set of one or more secondary orbital angular momentum modes based at least in part on the selecting

Figure 18:
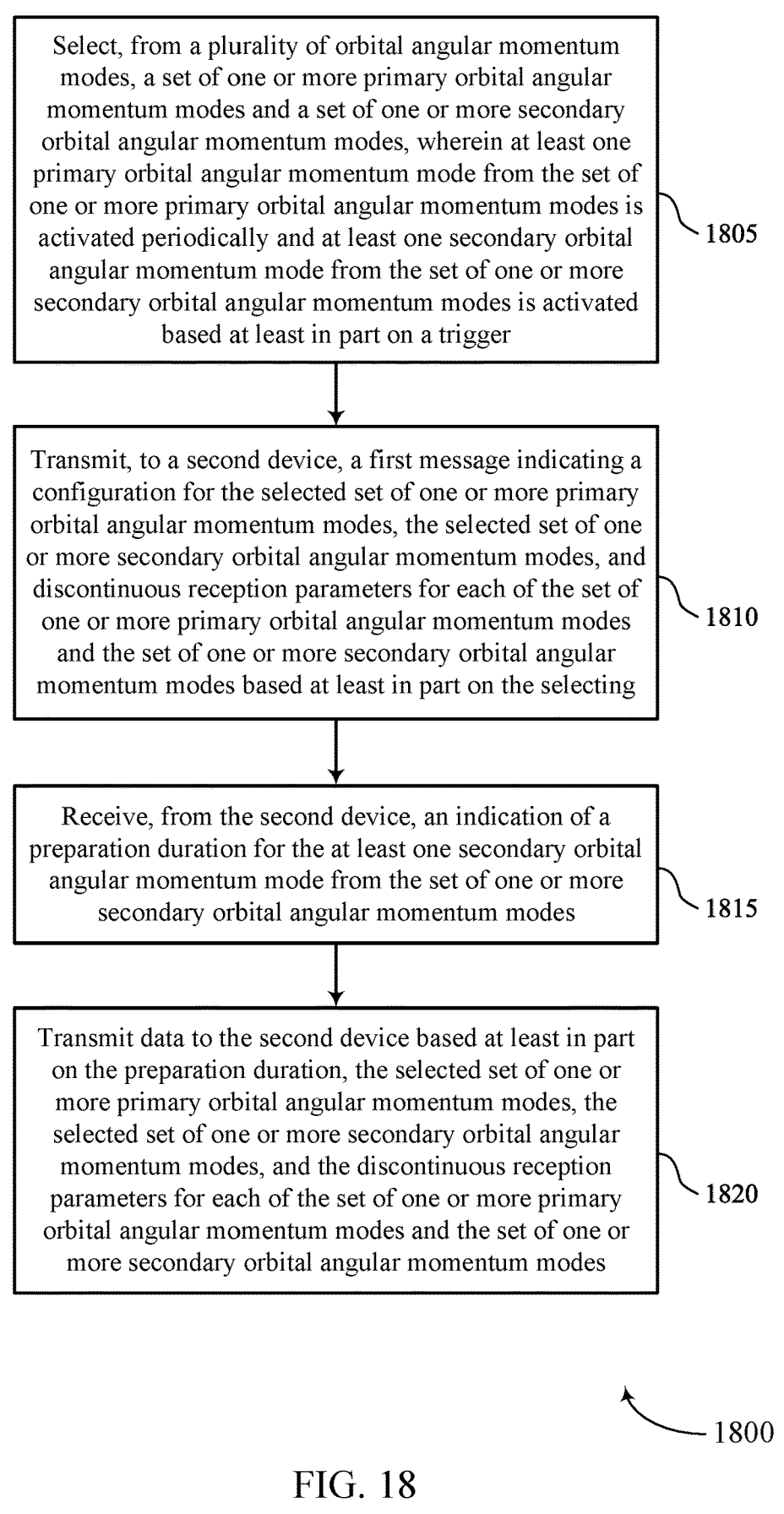

Select, from a plurality of orbital angular momentum modes, a set of one or more primary orbital angular momentum modes and a set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger

1805

Transmit, to a second device, a first message indicating a configuration for the selected set of one or more primary orbital angular momentum modes, the selected set of one or more secondary orbital angular momentum modes, and discontinuous reception parameters for each of the set of one or more primary orbital angular momentum modes and the set of one or more secondary orbital angular momentum modes based at least in part on the selecting

1810

Receive, from the second device, an indication of a preparation duration for the at least one secondary orbital angular momentum mode from the set of one or more secondary orbital angular momentum modes

1815

Transmit data to the second device based at least in part on the preparation duration, the selected set of one or more primary orbital angular momentum modes, the selected set of one or more secondary orbital angular momentum modes, and the discontinuous reception parameters for each of the set of one or more primary orbital angular momentum modes and the set of one or more secondary orbital angular momentum modes

Figure 19:
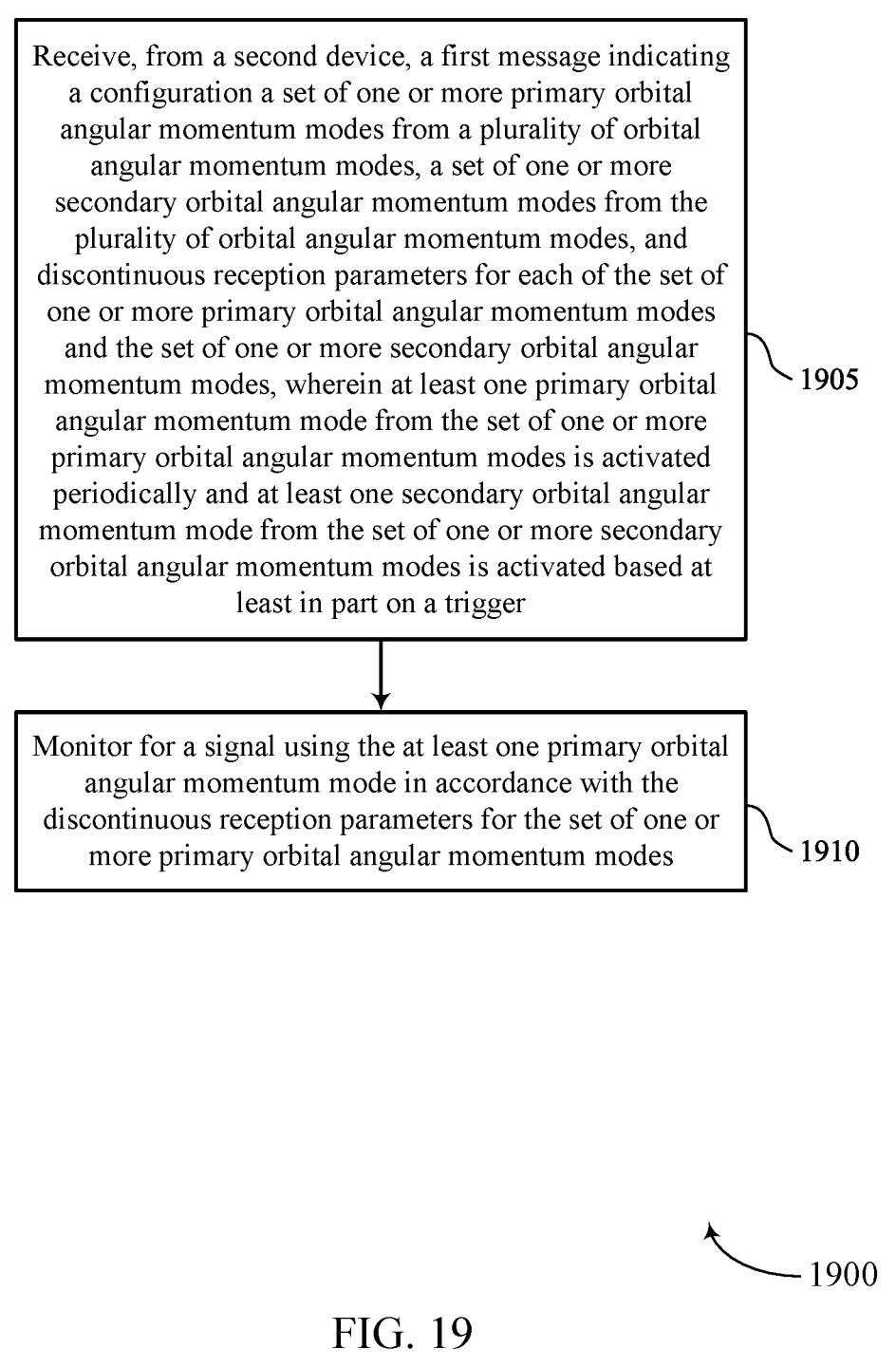

Receive, from a second device, a first message indicating a configuration a set of one or more primary orbital angular momentum modes from a plurality of orbital angular momentum modes, a set of one or more secondary orbital angular momentum modes from the plurality of orbital angular momentum modes, and discontinuous reception parameters for each of the set of one or more primary orbital angular momentum modes and the set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger

1905

Monitor for a signal using the at least one primary orbital angular momentum mode in accordance with the discontinuous reception parameters for the set of one or more primary orbital angular momentum modes

Figure 20:
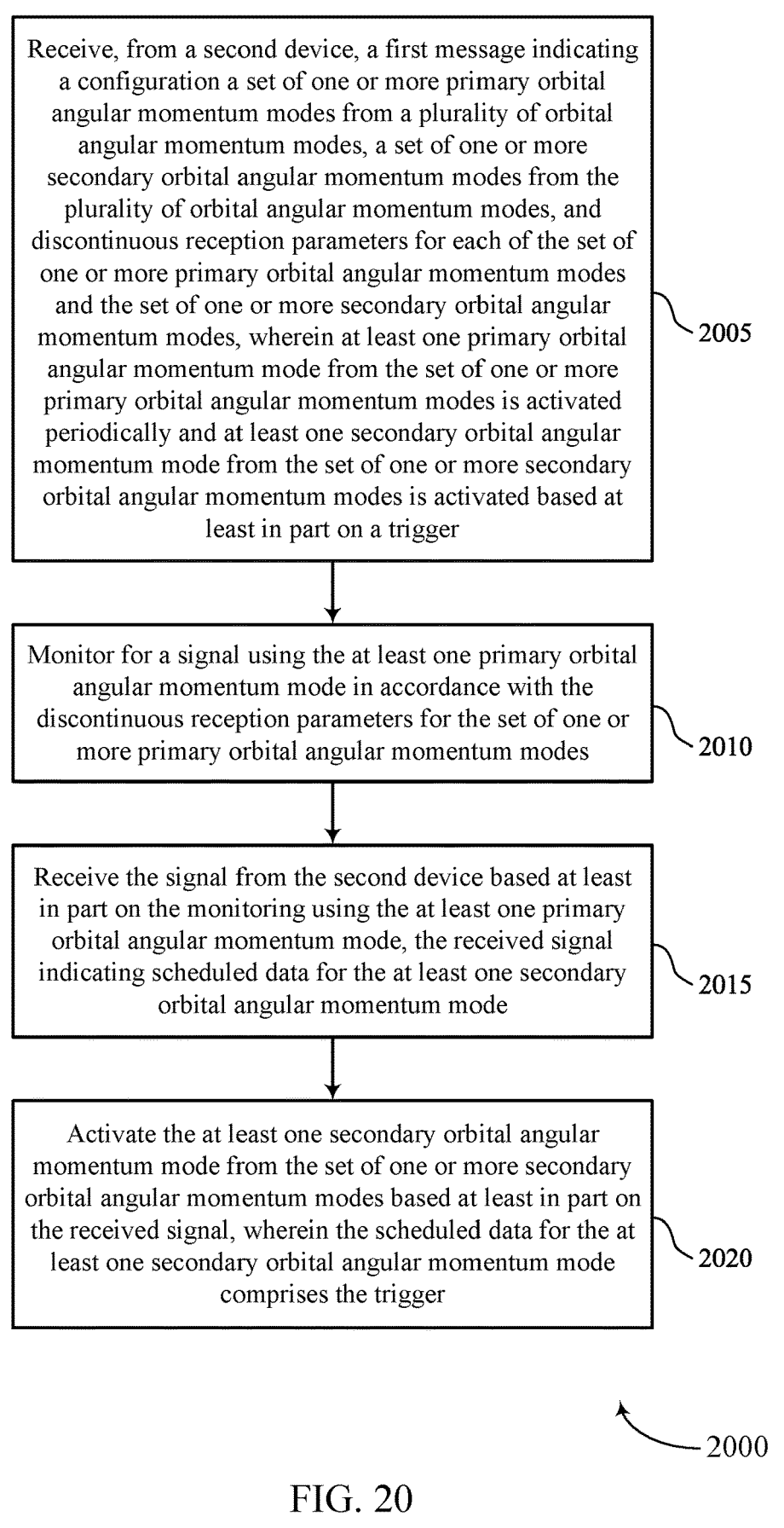

Receive, from a second device, a first message indicating a configuration a set of one or more primary orbital angular momentum modes from a plurality of orbital angular momentum modes, a set of one or more secondary orbital angular momentum modes from the plurality of orbital angular momentum modes, and discontinuous reception parameters for each of the set of one or more primary orbital angular momentum modes and the set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger

2005

Monitor for a signal using the at least one primary orbital angular momentum mode in accordance with the discontinuous reception parameters for the set of one or more primary orbital angular momentum modes

2010

Receive the signal from the second device based at least in part on the monitoring using the at least one primary orbital angular momentum mode, the received signal indicating scheduled data for the at least one secondary orbital angular momentum mode

2015

Activate the at least one secondary orbital angular momentum mode from the set of one or more secondary orbital angular momentum modes based at least in part on the received signal, wherein the scheduled data for the at least one secondary orbital angular momentum mode comprises the trigger

MULTIMODE DISCONTINUOUS RECEPTION IN ORBITAL ANGULAR MOMENTUM COMMUNICATIONS

CROSS REFERENCE

The present Application is a 371 national stage filing of International PCT Application No. PCT/CN2021/123758 by Huang et al. entitled "MULTIMODE DISCONTINUOUS RECEPTION IN ORBITAL ANGULAR MOMENTUM COMMUNICATIONS," filed Oct. 14, 2021, which is assigned to the assignee hereof, and which is expressly incorporated by reference in its entirety herein.

FIELD OF TECHNOLOGY

The following relates to wireless communications, including multimode discontinuous reception (DRX) in orbital angular momentum (OAM) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may use various techniques for orbital angular momentum (OAM) communications. In some cases, however, some OAM communication techniques may increase power and resource (e.g., hardware) consumption.

SUMMARY

The described techniques relate to improved methods, systems, devices, and apparatuses that support multimode discontinuous reception (DRX) in orbital angular momentum (OAM) communications. Generally, the described techniques provide for a wireless device (e.g., a user equipment (UE), a base station) to use multimode DRX in OAM communications, which may increase efficiency in communications between a transmitting device and a receiving device and decrease the amount of hardware used during the communications. For example, the transmitting device may select a set of primary OAM modes and a set of secondary OAM modes. In some examples, at least one primary OAM mode of the set of primary OAM modes may be activated periodically (e.g., in accordance with a DRX cycle), and at least one secondary OAM mode of the set of secondary OAM modes may be activated based on a trigger (e.g., based on data to be received for the at least one secondary OAM mode). The transmitting device may transmit a message to another wireless device indicating a configuration for the selected sets of primary and secondary OAM modes, as well as DRX parameters for each of the sets of OAM modes. In some cases, the receiving device may monitor for a signal using the at least one primary OAM mode in accordance with the DRX parameters for the set of primary OAM modes, and the receiving device may activate a second OAM mode based on receiving the signal. That is, the receiving device may monitor for the signal during an on-duration for the at least one primary OAM mode and may refrain from monitoring for the signal outside of the on-duration. Further, the secondary OAM modes may remain inactive until the trigger is received, which may result in relatively reduced hardware usage, thereby saving power at the receiving device, for example, because one or more hardware components may not be unnecessarily activated for one or more modes.

A method for wireless communication at a first device is described. The method may include selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger and transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

An apparatus for wireless communication at a first device is described. The apparatus may include a memory and a processor coupled to the memory and configured to select, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger and transmit, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

Another apparatus for wireless communication at a first device is described. The apparatus may include means for selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger and means for transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

A non-transitory computer-readable medium storing code for wireless communication at a first device is described. The code may include instructions executable by a processor to select, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger and transmit, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

Some examples of the method, apparatuses, and non-transitory computer-readable medium described herein may further include operations, features, means, or instructions for transmitting, to the second device, one or more reference signals corresponding to the set of multiple OAM modes and receiving, from the second device, a second message indicating a respective index and a respective channel status for one or more OAM modes of the set of multiple OAM modes based on the one or more reference signals, where selecting the set of one or more primary OAM modes and the set of one or more secondary OAM modes may be based on the second message.

Some examples of the method, apparatuses, and non-transitory computer-readable medium described herein may further include operations, features, means, or instructions for receiving, within the second message, an indication of a relationship between each OAM mode and one or more rings of a uniform circular array (UCA) panel, where selecting the set of one or more primary OAM modes and the set of one or more secondary OAM modes may be based on the indication of the relationship.

In some examples of the method, apparatuses, and non-transitory computer-readable medium described herein, selecting the set of one or more primary OAM modes and the set of one or more secondary OAM modes may include operations, features, means, or instructions for selecting a first primary OAM mode corresponding to a first ring of the one or more rings based on the relationship between each OAM mode and the one or more rings of the UCA panel, selecting a second primary OAM mode corresponding to a second ring of the one or more rings based on the relationship between each OAM mode and the one or more rings of the UCA panel, the second ring being different from the first ring, selecting a first subset of one or more secondary OAM modes that corresponds to the first ring of the one or more rings based on the relationship between each OAM mode and the one or more rings of the UCA panel, and selecting a second subset of one or more secondary OAM mode corresponding to the second ring of the one or more rings based on the relationship between each OAM mode and the one or more rings of the UCA panel.

Some examples of the method, apparatuses, and non-transitory computer-readable medium described herein may further include operations, features, means, or instructions for determining, for each primary OAM mode of the set of one or more primary OAM modes, a start position of an on-duration, a length of the on-duration, and a length of an inactivity timer, where the DRX parameters for the set of one or more primary OAM modes include the start position of the on-duration, the length of the on-duration, and the length of the inactivity timer.

In some examples of the method, apparatuses, and non-transitory computer-readable medium described herein, the on-duration corresponds to a time period during which the at least one primary OAM mode from the set of one or more primary OAM modes may be activated in accordance with a DRX cycle, and where the inactivity timer corresponds to a time duration after which the at least one primary OAM mode from the set of one or more primary OAM modes may be deactivated based on an absence of signaling.

In some examples of the method, apparatuses, and non-transitory computer-readable medium described herein, the inactivity timer for the set of one or more primary OAM modes may be greater than an inactivity timer for the set of one or more secondary OAM modes.

In some examples of the method, apparatuses, and non-transitory computer-readable medium described herein, the inactivity timer corresponds to a time duration after which the at least one secondary OAM mode from the set of one or more secondary OAM modes may be deactivated based on the absence of signaling.

Some examples of the method, apparatuses, and non-transitory computer-readable medium described herein may further include operations, features, means, or instructions for determining a length of an inactivity timer for each secondary OAM mode of the set of one or more secondary OAM modes, where the DRX parameters for the set of one or more secondary OAM modes include the length of the inactivity timer.

Some examples of the method, apparatuses, and non-transitory computer-readable medium described herein may further include operations, features, means, or instructions for receiving, from the second device, an indication of a preparation duration for the at least one secondary OAM mode from the set of one or more secondary OAM modes and transmitting data to the second device based on the preparation duration, the selected set of one or more primary OAM modes, the selected set of one or more secondary OAM modes, and the DRX parameters for each of the set of one or more primary OAM modes and the set of one or more secondary OAM modes.

A method for wireless communication at a first device is described. The method may include receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger and monitoring for a signal using the at least one primary OAM mode in accordance with the DRX parameters for the set of one or more primary OAM modes.

An apparatus for wireless communication at a first device is described. The apparatus may include a memory and a processor coupled to the memory and configured to cause the apparatus to receive, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger and monitor for a signal using the at least one primary OAM mode in accordance with the DRX parameters for the set of one or more primary OAM modes.

Another apparatus for wireless communication at a first device is described. The apparatus may include means for receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger and means for monitoring for a signal using the at least one primary OAM mode in accordance with the DRX parameters for the set of one or more primary OAM modes.

A non-transitory computer-readable medium storing code for wireless communication at a first device is described. The code may include instructions executable by a processor to receive, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger and monitor for a signal using the at least one primary OAM mode in accordance with the DRX parameters for the set of one or more primary OAM modes.

Some examples of the method, apparatuses, and non-transitory computer-readable medium described herein may further include operations, features, means, or instructions for receiving the signal from the second device based on the monitoring using the at least one primary OAM mode, the received signal indicating scheduled data for the at least one secondary OAM mode and activating the at least one secondary OAM mode from the set of one or more secondary OAM modes based on the received signal, where the scheduled data for the at least one secondary OAM mode includes the trigger.

Some examples of the method, apparatuses, and non-transitory computer-readable medium described herein may further include operations, features, means, or instructions for receiving, from the second device, one or more reference signals corresponding to the set of multiple OAM modes, determining, based on a measurement of the one or more reference signals, a respective index and a respective channel status for one or more OAM modes of the set of multiple OAM modes, and transmitting, to the second device, a second message indicating the respective index and the respective channel status for the one or more OAM modes, where the set of one or more primary OAM modes and the set of one or more secondary OAM modes may be based on the second message.

Some examples of the method, apparatuses, and non-transitory computer-readable medium described herein may further include operations, features, means, or instructions for determining a relationship between each OAM mode and one or more rings of a UCA panel and transmitting, within the second message, an indication of the relationship between each OAM mode and the one or more rings of the UCA panel, where the set of one or more primary OAM modes and the set of one or more secondary OAM modes may be based on the relationship.

In some examples of the method, apparatuses, and non-transitory computer-readable medium described herein, the set of one or more primary OAM modes includes a first primary OAM mode corresponding to a first ring of the one or more rings and a second primary OAM mode corresponding to a second ring of the one or more rings, the second ring being different from the first ring, and where the first primary OAM mode and the second primary OAM mode may be based on the relationship between each OAM mode and the one or more rings of the UCA panel.

In some examples of the method, apparatuses, and non-transitory computer-readable medium described herein, the set of one or more secondary OAM modes includes a first subset of secondary OAM modes corresponding to a first ring of the one or more rings and a second subset of secondary OAM modes corresponding to a second ring of the one or more rings, the second ring being different from the first ring, and where the first subset of secondary OAM modes and the second subset of secondary OAM modes may be based on the relationship between each OAM mode and the one or more rings of the UCA panel.

In some examples of the method, apparatuses, and non-transitory computer-readable medium described herein, the DRX parameters for the set of one or more primary OAM modes include a start position of an on-duration, a length of the on-duration, a length of an inactivity timer, or any combination thereof.

In some examples of the method, apparatuses, and non-transitory computer-readable medium described herein, the on-duration corresponds to a time period during which the at least one primary OAM mode may be activated in accordance with a DRX cycle, and where the inactivity timer corresponds to a time duration after which the at least one primary OAM mode may be deactivated based on an absence of signaling.

In some examples of the method, apparatuses, and non-transitory computer-readable medium described herein, monitoring for the signal using the at least one primary OAM mode may include operations, features, means, or instructions for monitoring for the signal based on the on-duration and the length of the on-duration and starting the inactivity timer for the at least one primary OAM mode based on receiving the signal from the second device.

Some examples of the method, apparatuses, and non-transitory computer-readable medium described herein may further include operations, features, means, or instructions for receiving data from the second device using the at least one secondary OAM mode based on receiving the signal from the second device and starting an inactivity timer for the at least one secondary OAM mode based on receiving the data from the second device.

In some examples of the method, apparatuses, and non-transitory computer-readable medium described herein, the inactivity timer for the at least one primary OAM mode may be greater than the inactivity timer for the at least one secondary OAM mode.

Some examples of the method, apparatuses, and non-transitory computer-readable medium described herein may further include operations, features, means, or instructions for deactivating the at least one primary OAM mode from the set of one or more primary OAM modes, the at least one secondary OAM mode from the set of one or more secondary OAM modes, or both based on an expiration of the on-duration for the at least one primary OAM mode, an expiration of the inactivity timer for the at least one secondary OAM mode, or both.

In some examples of the method, apparatuses, and non-transitory computer-readable medium described herein, the DRX parameters for the set of one or more secondary OAM modes include a length of an inactivity timer.

In some examples of the method, apparatuses, and non-transitory computer-readable medium described herein, the inactivity timer corresponds to a time duration after which the at least one secondary OAM mode from the set of one or more secondary OAM modes may be deactivated based on an absence of signaling.

Some examples of the method, apparatuses, and non-transitory computer-readable medium described herein may further include operations, features, means, or instructions for transmitting, to the second device, an indication of a preparation duration for the at least one secondary OAM mode from the set of one or more secondary OAM modes and activating the at least one secondary OAM mode from the set of one or more secondary OAM modes in accordance with the preparation duration.

BRIEF DESCRIPTION OF THE DRAWINGS

FIGS. 16 through 20 show flowcharts illustrating methods that support multimode DRX in OAM communications in accordance with aspects of the present disclosure.

DETAILED DESCRIPTION

Figure 1:
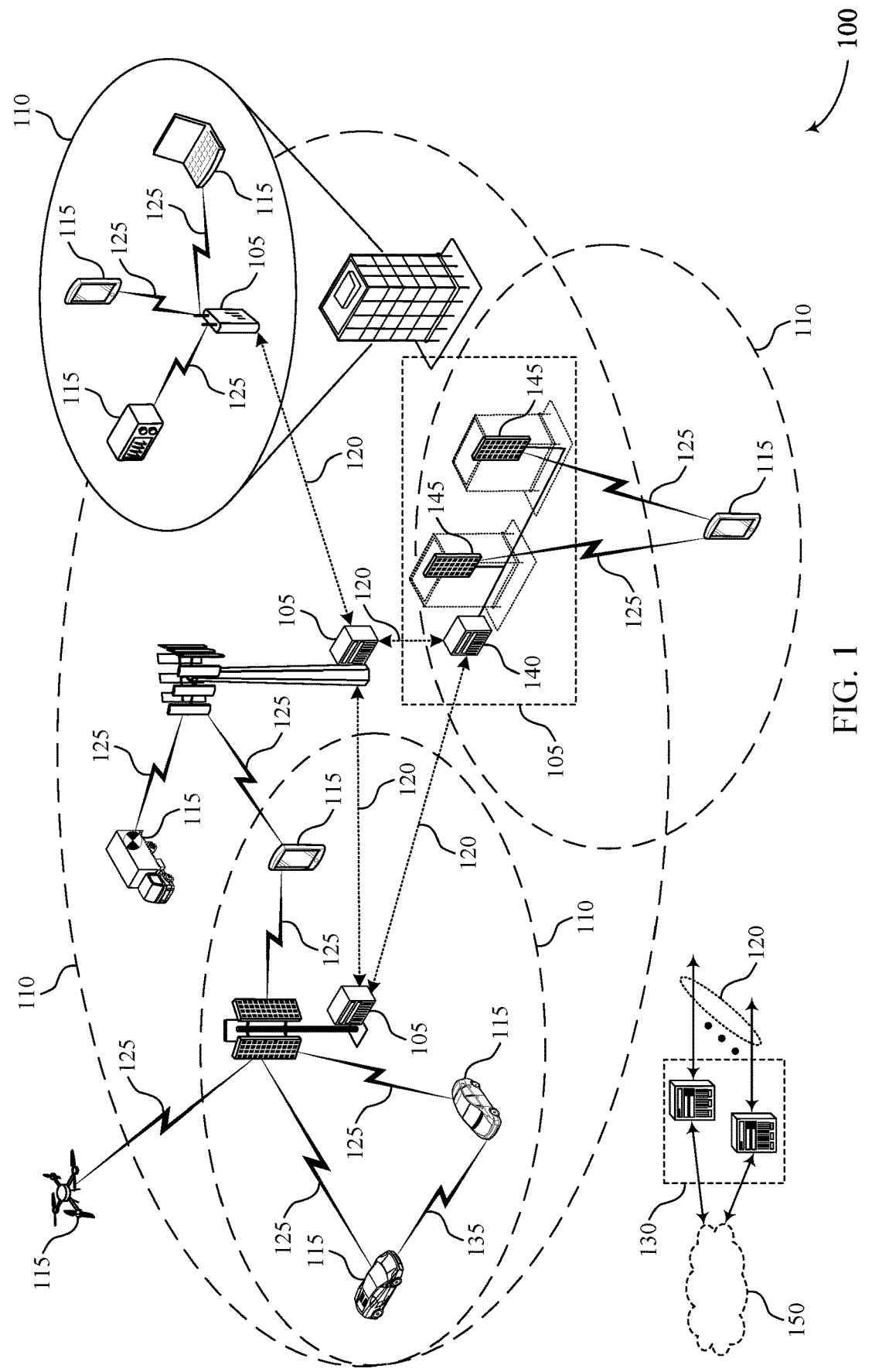
FIG. 1 illustrates an example of a wireless communications system that supports multimode discontinuous reception (DRX) in orbital angular momentum (OAM) communications in accordance with aspects of the present disclosure.

In some wireless communications systems, wireless devices, such as base stations or user equipment (UEs), or both, may communicate directionally, for example, using beams to orient communication signals over one or more directions. In some systems, such as in orbital angular momentum (OAM)-capable communications systems, the wireless devices may communicate using OAM beams, which, in addition to providing signal directionality, may also provide an additional dimension for signal or channel multiplexing. In some examples, such an additional dimension may include a state or a mode of the OAM beam, where different states or modes of OAM beams may be orthogonal to each other. As such, different OAM states or modes may be multiplexed together (also referred to herein as OAM multiplexing) to increase the capacity of an OAM link. In some cases, a wireless device may use spiral phase plate (SPP) or uniform circular array (UCA)-based methods to generate an OAM beam for transmission and reception of signals.

In some cases, a transmitting device and a receiving device may each be equipped with one or more antenna arrays (e.g., antenna circles, transmit rings, receive rings, UCAs) that may enable the transmitting device and the receiving device to communicate according to one or more OAM modes. In an OAM-based communication system in which the transmitting device, the receiving device, or both are each equipped with multiple antenna arrays, the efficiency of each antenna array (e.g., channel gains of each antenna circle) may be different for each OAM mode. For example, a signal produced by a first antenna circle according to a first OAM mode may have a different channel gain than a signal produced by a second antenna circle according to the first OAM mode. To increase efficiency and throughput in the OAM-communications system, the transmitting device (e.g., a UE, a base station, an integrated access and backhaul (IAB) node, a relay node, or the like) or the receiving device (e.g., a UE, a base station, an IAB node, a relay node, or the like), or both may determine a transmission scheme for the transmitting device to use for transmitting messages (e.g., data messages, control messages) to the receiving device. For example, the transmitting device, the receiving device, or both may be configured to determine which antenna circle of the transmitting device (e.g., transmitter circle) to use for each OAM mode so as to optimize data throughput of each OAM mode.

In some examples, the transmitting device and the receiving device that support OAM communications may use a relatively large number of hardware components to transmit and receive OAM waveforms. For example, an OAM transmitter and an OAM receiver may each use a dedicated transceiver unit (TxRU) interface and corresponding analog transmit and receive beamformers for each OAM mode (e.g., at each transmit and receive ring). As such, a relatively large number of TxRUs and other hardware components may be powered on for communications using multiple OAM modes, which may increase power and resource (e.g., hardware) consumption at a wireless device.

Techniques described herein enable a wireless device (e.g., a UE, a base station) to use multimode discontinuous reception (DRX) in OAM communications, which may increase efficiency in communications between a transmitting device and a receiving device and decrease the amount of hardware used during the communications. For example, the transmitting device may select a set of primary OAM modes and a set of secondary OAM modes. In some examples, at least one primary OAM mode of the set of primary OAM modes may be activated periodically (e.g., using an on-duration of a DRX cycle), and at least one secondary OAM mode of the set of secondary OAM modes may be activated based on a trigger (e.g., based on data to be received using one or more secondary OAM modes). The transmitting device may transmit a message to a second device indicating a configuration for the selected sets of primary and secondary OAM modes, and DRX parameters for each of the sets of OAM modes. In some cases, the receiving device may monitor for a signal using the at least one primary OAM mode in accordance with the DRX parameters for the set of primary OAM modes, and the receiving device may activate a second OAM mode based on receiving the signal. That is, the receiving device may monitor for the signal during an on-duration for the at least one primary OAM mode and may refrain from monitoring for the signal outside of the on-duration to reduce hardware usage. To determine the primary and secondary OAM modes, the transmitting device may transmit a set of reference signals (e.g., per-mode reference signals), and may receive an indication of various OAM modes from the receiving device. In some cases, the indication of the OAM modes may further include information relating the indicated OAM modes to corresponding transmit or receive rings (e.g., of an UCA).

Aspects of the disclosure are initially described in the context of wireless communications systems. Aspects of the disclosure are then described in the context of multi-ring UCA-based OAM configurations, OAM configurations, and process flows. Aspects of the disclosure are further illustrated by and described with reference to apparatus diagrams, system diagrams, and flowcharts that relate to multimode DRX in OAM communications.

FIG. 1 illustrates an example of a wireless communications system 100 that supports multimode DRX in OAM communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of Ts=1/ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may support relatively higher data rates, which may use larger bandwidths and higher frequency bands. Because of the higher frequency bands, the wireless communications system 100 may implement denser network nodes and more backhaul capabilities. In some examples, the wireless communications system 100 may support OAM communications, for example for a line-of-sight (LOS) transmission scheme for high spatial multiplexing with low complexity. In OAM communications, a transmitter may transmit multiple coaxially-propagating and spatially-overlapping electromagnetic (EM) waves, each carrying a data stream, to a receiver. Each wave may be transmitted according to an OAM mode. For example, the waves may be transmitted by a transmit aperture and may propagate along one axis to the receiver. In some cases, the transmitter and the receiver may include a UE 115, a base station 105, or another wireless device.

The wavefront of an OAM wave may have a helical shape, and the phases of an OAM wave in a transverse plane may have the form of $\exp(i\varphi l)$, where $\varphi$ may represent an azimuthal angle and $l$ may represent an unbounded integer (e.g., an OAM order, a mode index). In some examples, the helical wavefronts of OAM waves may be generated by an SPP, which may generate a helical wave in the entire space between the transmitter and the receiver. Additionally or alternatively, the helical wavefronts may be generated by a UCA panel, where the helical wave may be generated via distributed points. That is, received signals at antenna elements of a receiver UCA panel (e.g., a UCA ring) may have identical amplitude and progressive phases. As such, UCA-based OAM communications may be similar to UCA-based MIMO communications. In some examples, OAM communications may create a high-spatial multiplexing degree in an LOS channel, which may lead to a high data rate. In addition, OAM communications may enable the use of static transmit and receive beamforming vector weights, which may reduce the use of inter-mode equalization at a base band (e.g., under directional alignment) and reduce base band processing complexity.

Some OAM communications may be based on a UCA panel (e.g., a single ring). For example, the utilization of SPP may generate real helical waves (e.g., OAM beams), however, may use the same number of SPPs as the number of multiplexed OAM modes, which may restrict a multiplex degree. To utilize abundant multiplexed modes in OAM communications with a practical cost, a transmitter may use a UCA antenna ring to form phase-shifted received signal values at discrete element positions of a UCA antenna ring at a receiver. The UCA antenna rings at the transmitter and the receiver may be co-axial, include the same number of antenna elements, and include the same radii or different radii. In some examples, signals transmitted between an OAM transmitter and OAM receiver (e.g., between the transmitter UCA antenna ring and the receiver UCA antenna ring) may be represented by a channel matrix H, where H may be a circulant matrix where its eigenvectors may be equal to DFT vectors. In some aspects, the propagation of the waveform over a channel may be further represented by elements of the channel matrix H being modified by $h_{n,m}$ defined by Equation 1 below:

$$h_{n,m} = \frac{\sqrt{G}\,\lambda}{4\pi d_{m,n}} \exp\left(-j2\pi \frac{d_{m,n}}{\lambda}\right) \qquad (1)$$

Here, G may represent a value relative to receive and transmit antennas, $\lambda$ may represent a wavelength of an OAM wave communicated between the transmitter and the receiver, and $d_{m,n}$ may represent a distance between the transmitter and the receiver.

In some examples, data streams through analog beamforming may be orthogonal for OAM communications such that a receiver may refrain from relying upon inter-stream equalization in the base band. For example, in analog beamforming when a transmitter and the receiver utilize an inverse DFT (IDFT) vector and a corresponding DFT vector as a precoding vector or combining vector, respectively, the base band spatial streams may be orthogonal. As such, the transmitter and the receiver may use a dedicated TxRU interface and corresponding analog transmit and receive beamformers for each OAM mode (e.g., at each transmit and receive ring). In cases with a high frequency band (e.g., sub-THz, THz), short transmission distances, and relatively large apertures, there may be some quantity (e.g., tens or more) of multiplexed OAM modes. In addition, because the analog beamforming of each spatial stream may utilize most or all of the elements in one OAM ring, combiners and splitters may be used at the OAM transmitter and the OAM receiver when more than one spatial streams are mapped into one ring. As such, a relatively large number of TxRUs, transmit and receive beamformers, combiners, and splitters may be switched on for communications using multiple OAM modes simultaneously, which may use a large amount of power.

To reduce the amount of power and hardware (e.g., resources) consumed in OAM communications, wireless communications system 100 may support a multimode DRX scheme by which a quantity of active OAM modes may be adaptive with any traffic usage and an OAM mode-to-OAM ring mapping relation. For example, the transmitting device (e.g., a UE 115, a base station 105) may select a set of primary OAM modes and a set of secondary OAM modes. In some examples, at least one primary OAM mode of the set of primary OAM modes may be activated periodically, and at least one secondary OAM mode of the set of secondary OAM modes may be activated based on a trigger. The transmitting device may transmit a message to a receiving device (e.g., a UE 115, a base station 105), indicating a configuration for the selected sets of primary and secondary OAM modes, and for DRX parameters for each of the sets of OAM modes. In some cases, the receiving device may monitor for a signal using the at least one primary OAM mode in accordance with the DRX parameters for the set of primary OAM modes, and the receiving device may activate a second OAM mode based on receiving the signal.

Figure 2:
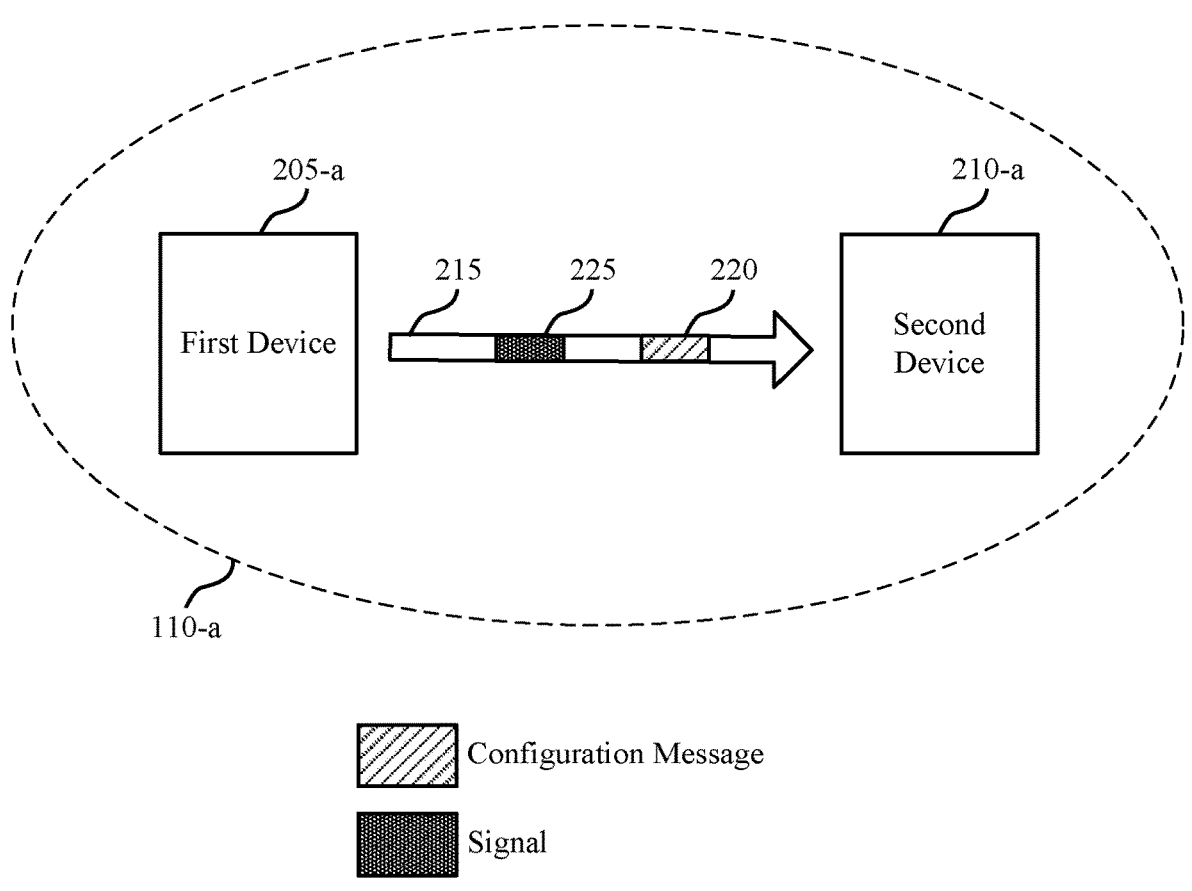
FIG. 2 illustrates an example of a wireless communications system that supports multimode DRX in OAM communications in accordance with aspects of the present disclosure.

FIG. 2 illustrates an example of a wireless communications system 200 that supports multimode DRX in OAM communications in accordance with aspects of the present disclosure. In some examples, wireless communications system 200 may implement aspects of wireless communications system 100. The wireless communications system 200 may illustrate communication between a first device 205-a and a second device 210-a, where the first device 205-a and the second device 210-a may be the same type of device or may be different types of devices as described herein. For example, the first device 205-a and the second device 210-a may each be a UE, a base station, an IAB node, or another wireless device.

In some cases, the first device 205-a or the second device 210-a may serve a geographic coverage area 110-a. In some examples, the wireless communications system 200 (which may be an example of a sixth generation (6G) system, a fifth generation (5G) system, or other generation of system) may support OAM-based communications. For example, the first device 205-a and the second device 210-a may transmit or receive OAM beams, or OAM-related signals over a communications link 215 within the geographic coverage area 110-a.

The first device 205-a and the second device 210-a may perform OAM communications using a single-ring or multiring UCA-based OAM configuration for multiple OAM modes. In some examples, the first device 205-a may transmit per-mode reference signals (e.g., one or more reference signals corresponding to the multiple OAM modes) to the second device 210-a. The second device 210-a may measure the reference signals (e.g., channel status measurements) and determine a set of OAM modes that may be usable. In some cases, the second device 210-a may report an index and a channel status corresponding to each of the OAM modes in the set to the first device 205-a. For example, the second device 210-a may determine a respective index and a respective channel status for each of the OAM modes based on a measurement of the one or more reference signals, and the second device 210-a may transmit a message to the first device 205-a indicating the respective index and the respective channel status. Additionally or alternatively, the second device 210-a may indicate a ring-mode relationship to the first device 205-a, where the relationship may indicate that the OAM modes are in one ring (e.g., for single-ring UCA-based OAM communications) or divided among multiple rings (e.g., for multi-ring UCA-based OAM communications). That is, the ring-mode relationship may indicate which UCA rings are associated with respective OAM modes.

The set of OAM modes may be divided into primary OAM modes and secondary OAM modes, where the primary OAM modes may enter an on-duration periodically and the secondary OAM modes may enter an on-duration based on a trigger. For example, the first device 205-a may select a set of primary OAM modes and a set of secondary OAM modes, and the first device 205-a may transmit a message 220 to the second device 210-a indicating a configuration for the selected sets of primary and secondary OAM modes, and for DRX parameters for each of the sets of OAM modes. The first device 205-a may transmit the message 220 via RRC signaling (e.g., an RRC configuration message) or via a MAC control element (MAC-CE). In some cases, the first device 205-a may determine that OAM modes with good channel statuses are primary OAM modes. Additionally or alternatively, the first device 205-a may determine the primary OAM modes and the secondary OAM modes based on an order of the OAM modes. In other examples, the set of primary OAM modes and the set of secondary OAM modes may be preconfigured. In some aspects, the DRX parameters corresponding to the set of primary OAM modes may include a start position and a length of an on-duration for a primary OAM modes, a length of an inactivity timer corresponding to the primary OAM mode. The DRX parameters corresponding to the set of secondary OAM modes may include a length of an inactivity timer corresponding to a secondary OAM mode.

In some cases, the second device 210-a may monitor for a signal 225 using at least one primary OAM mode of the set of primary OAM modes in accordance with the DRX parameters for the set of primary OAM modes. The second device 210-a may receive the signal 225 from the first device 205-a using the primary OAM mode, where the signal 225 may indicate scheduled data for at least one secondary OAM mode of the set of secondary OAM modes. Based on receiving the signal 225, the second device 210-a may activate the secondary OAM mode, and may receive the scheduled data from the signal 225 which may include the trigger (e.g., to activate the on-duration for the secondary OAM mode). By dividing the set of OAM modes into a set of primary OAM modes and a set of secondary OAM modes, and by enabling the second device 210-a to monitor for the primary OAM modes during an on-duration while other OAM modes (and corresponding hardware) are inactive, the wireless communications system 200 may save power at the second device 210-a.

Figure 3:
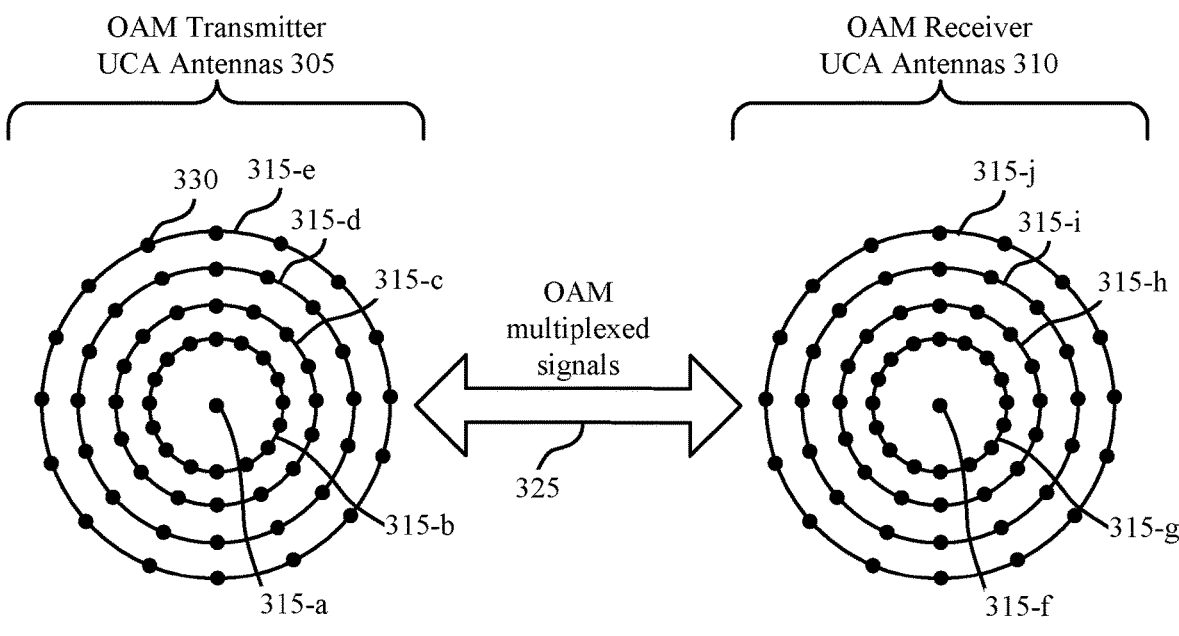
FIG. 3 illustrates an example of a multi-ring uniform circular array (UCA)-based OAM configuration that supports multimode DRX in OAM communications in accordance with aspects of the present disclosure.
Figure 3:
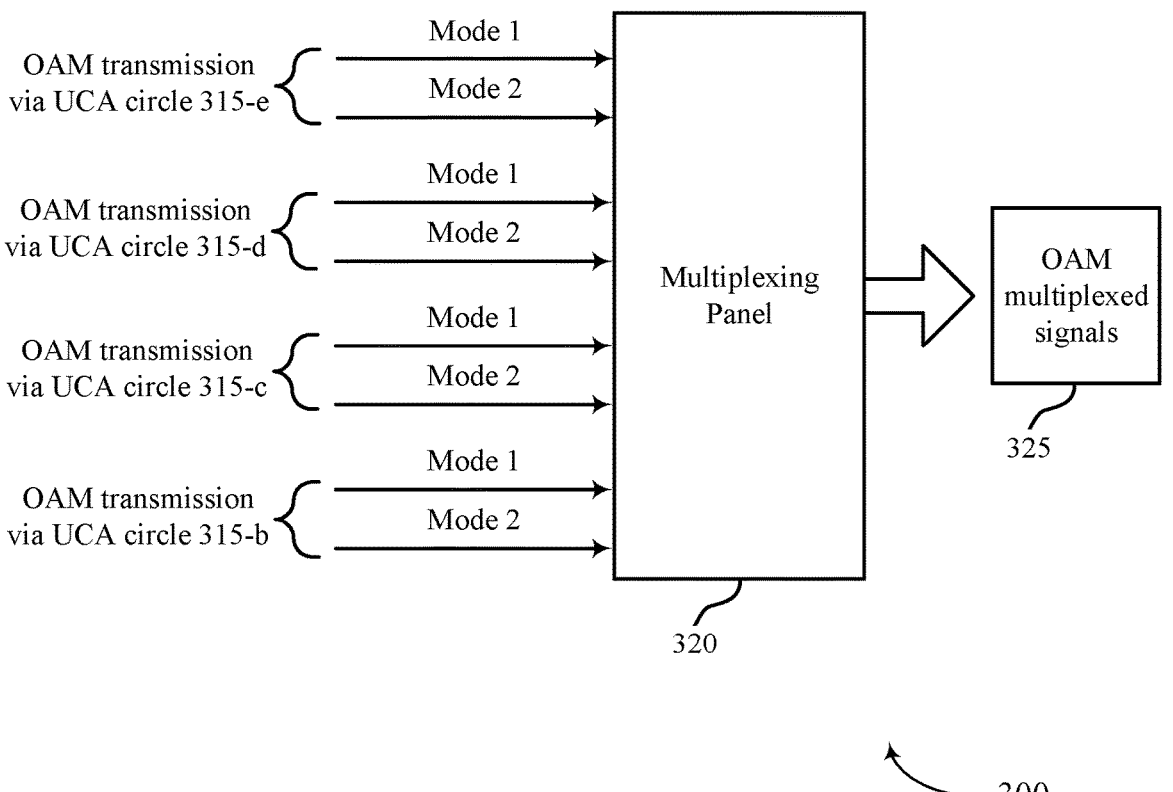

FIG. 3 illustrates an example of a multi-ring UCA-based OAM configuration 300 that supports multimode DRX in OAM communications in accordance with aspects of the present disclosure. In some examples, multi-ring UCA-based OAM configuration 300 may implement aspects of wireless communications systems 100 or 200. In this example, a transmitting device (e.g., UE, base station, a first device) may include OAM transmitter UCA antennas 305 and a receiving device (e.g., UE, base station, a second device) may include OAM receiver UCA antennas 310.

As described herein, a device may be configured with a UCA antenna to realize OAM-based communications. In some cases, a device may be configured with multiple UCA antenna circles 315 (also referred to herein as UCA circles 315). For example, a transmitting device and a receiving device may each be configured with multiple co-axis UCA antenna circles 315 (also referred to herein as UCA circles 315). A transmitting device may be configured with OAM transmitter UCA antennas 305 and a receiving device may be configured with OAM receiver UCA antennas 310. A transmitting device and a receiving device may be configured with the same number of UCA circles 315, or a different number of UCA circles. In the example depicted by FIG. 3, a transmitting device and a receiving device may each be configured with five antenna circles, where each antenna circle may include one or more antenna elements 330. Each UCA circle 315 (e.g., UCA circle 315-a through UCA circle 315-j) may include any number of antenna elements 330.

A device may be configured with UCA circles 315 (e.g., UCA circles 315-a through 315-e) at a transmitter of the device, and the same device may be configured with UCA circles 315 (e.g., UCA circles 315-f through 315-j) at a receiver of the device. For example, a transmitting device (e.g., second device 210-a as described with reference to FIG. 2) may be configured with a UCA circle 315-a, a UCA circle 315-b, a UCA circle 315-c, a UCA circle 315-d, and a UCA circle 315-e (also referred to herein as downlink transmitter circles of the transmitting device), and the receiving device (e.g., a first device 205-a as described with reference to FIG. 2) may be configured with a UCA circle 315-f, a UCA circle 315-g, a UCA circle 315-h, a UCA circle 315-i, and a UCA circle 315-j (also referred to herein as downlink receiver circles of the receiving device) at a receiver of the receiving device. In some examples, the UCA circle 315-a, the UCA circle 315-b, the UCA circle 315-c, the UCA circle 315-d, and the UCA circle 315-e may be configured to receive transmissions (e.g., uplink transmissions), and the UCA circle 315-f, the UCA circle 315-g, the UCA circle 315-h, the UCA circle 315-i, and the UCA circle 315-j may be configured to transmit transmissions (e.g., uplink transmissions).

In some examples, a transmitting device may be configured with the UCA circle 315-a, the UCA circle 315-b, the UCA circle 315-c, the UCA circle 315-d, and the UCA circle 315-e (also referred to herein as downlink transmitter circles), where the number of antenna elements 330 included on each UCA circle 315 may be the same, different, or partially the same. In some examples, the receiving device may be configured with the UCA circle 315-f, the UCA circle 315-g, the UCA circle 315-h, the UCA circle 315-i, and the UCA circle 315-j (also referred to herein as downlink receiver circles), where the number of antenna elements 330 included on each of the UCA circles 315 may be the same, different, or partially the same.

For example, all UCA circles 315 may include the same number of antenna elements 330, or each UCA circle 315 may include a different number of antenna elements 330, or a subset of the UCA circles 315 may include the same number of antenna elements 330. In some cases, the number of antenna elements 330 included on each UCA circle 315 may be based on the radius of the UCA circle 315. Each of the UCA circles 315 that a device is configured with may have the same radius, or different radii, or some may be the same and some may be different. The UCA circles 315 a device is configured with may be configured in any orientation. For example, the UCA circles may each have a different radius and be interlaid (e.g., concentrically), such that one UCA circle 315 may sit inside another UCA circle 315, and so on, as depicted in FIG. 3.

In some cases, intra-circle OAM transmissions (e.g., OAM signals, OAM streams) may be orthogonal to each other, such that OAM transmissions from the same UCA circle 315 may not interfere with one another. As such, OAM transmissions from the same UCA circle 315 of different OAM states or modes may be multiplexed together to increase the capacity of an OAM link. In some cases, inter-circle OAM transmissions (e.g., OAM signals, OAM streams) may be orthogonal with different OAM modes, such that OAM transmissions from different UCA circles 315 transmitted according to different OAM modes may be orthogonal to one another. Inter-circle OAM transmissions may be non-orthogonal with OAM transmissions of the same OAM mode, such that OAM transmissions from different UCA circles 315 transmitted according to the same OAM mode may be non-orthogonal to one other (e.g., cause interference to another other, cause cross-talk). For each OAM mode, inter-circle interference may exist where the OAM transmissions stream from one UCA circle 315 is mutually interfered with the OAM transmission stream transmitted from another UCA circle 315, where the two OAM transmission streams have the same OAM mode.

For example, multiple OAM transmissions may be transmitted from each UCA circle 315, where the intra-circle transmissions may be multiplexed if the intra-circle transmissions are associated with different modes. For example, a transmitting device may transmit a first OAM transmission according to OAM mode 1 via the UCA circle 315-e, and a second OAM transmission according to OAM mode 2 via the UCA circle 315-e. The transmitting device may transmit a third OAM transmission according to OAM mode 1 via the UCA circle 315-d, a fourth OAM transmission according to OAM mode 2 via the UCA circle 315-d, a fifth OAM transmission according to OAM mode 1 via the UCA circle 315-c, a sixth OAM transmission according to OAM mode 2 via the UCA circle 315-c, a seventh OAM transmission according to OAM mode 1 via the UCA circle 315-b, and an eighth OAM transmission according to OAM mode 2 via the UCA circle 315-b. The transmitting device may transmit one or more OAM transmissions according to one or more OAM modes via the UCA circle 315-a.

In some cases, the transmitting device may transmit an OAM transmission according to an OAM mode 0, for example, by using the same weight (e.g., a weight of one) for all antenna elements 330 of a UCA circle 315 (e.g., the3UCA circle 515-b) of the transmitting device. In some other cases, the transmitting device may transmit an OAM transmission according to OAM mode 0 by using the same weight (e.g., a weight of one) for all antenna elements 330 of multiple UCA circles 315 (e.g., the UCA circle 315-b and the UCA circle 315-c) of the transmitting device.

In some examples, the transmitting device may transmit an OAM transmission according to OAM mode 0 (also referred to herein as OAM order 0) via the center antenna (e.g., the UCA circle 315-a) of the transmitting device. In some cases, the transmitting device may generate a signal of OAM mode 0 via any of the UCA circles 315 (e.g., the UCA circle 315-b through the UCA circle 315-e).

In some examples, multiple OAM transmissions may be received by each UCA circle 315, where the intra-circle transmissions may be demultiplexed if the intra-circle transmissions are associated with different modes. For example, a receiving device may receive a first OAM transmission according to OAM mode 1 via the UCA circle 315-j, and a second OAM transmission according to OAM mode 2 via the UCA circle 315-j. The receiving device may receive a third OAM transmission according to OAM mode 1 via the UCA circle 315-i, a fourth OAM transmission according to OAM mode 2 via the UCA circle 315-i, a fifth OAM transmission according to OAM mode 1 via the UCA circle 315-h, a sixth OAM transmission according to OAM mode 2 via the UCA circle 315-h, a seventh OAM transmission according to OAM mode 1 via the UCA circle 315-g, and an eighth OAM transmission according to OAM mode 2 via the UCA circle 315-g. The receiving device may receive one or more OAM transmissions according to one or more OAM modes via the UCA circle 315-f.

In some cases, the receiving device may receive an OAM transmission according to OAM mode 0, for example, by using the same weight (e.g., a weight of one) for all antenna elements 330 of a UCA circle 315 (e.g., the UCA circle 315-g) of the receiving device. In some examples, the receiving device may receive an OAM transmission according to OAM mode 0 by using the same weight (e.g., a weight of one) for all antenna elements 330 of multiple UCA circles (e.g., the UCA circle 315-g and the UCA circle 315-h) of the receiving device.

In some cases, the receiving device may receive an OAM transmission according to OAM mode 0 (also referred to herein as OAM order 0) via the center antenna (e.g., the UCA circle 315-f) of the receiving device. In some other cases, the receiving device may receive a signal of OAM mode 0 via any of the UCA circles 315 (e.g., the UCA circle 315-f through the UCA circle 315-j).

As described herein, intra-circle OAM transmissions may be orthogonal. As such, the first and second OAM transmissions may be orthogonal to one another, and may, in some cases, be multiplexed. Similarly, the third and fourth transmissions may be orthogonal to one another, the fifth and sixth transmissions may be orthogonal to one another, and the seventh and the eighth transmission may be orthogonal to one another. Further, as described herein, inter-circle OAM transmissions transmitted via different OAM mode may be orthogonal. As such, the first transmission may be orthogonal with the fourth transmission, the sixth transmission, and the eight transmission, for example. Further, as described herein, inter-circle OAM transmissions transmitted via the same OAM mode may be non-orthogonal. As such, the first transmission may be non-orthogonal with the third transmission, the fifth transmission, and the seventh transmission, for example.

In some cases, a transmitting device may transmit the first transmission through the eighth transmissions, as described herein, simultaneously. As such, the first transmission through the eighth transmission may be transmitted via a multi-ring (e.g., multi-circle) UCA panel, such as multiplexing panel 320 that may multiplex one or more of the transmissions into OAM multiplexed signals 325. For example, the intra-circle transmissions may be multiplexed with each other, such as the first transmission and the second transmission. In another example, each of the first transmission through the eighth transmission may be multiplexed as transmitted via different circles and different modes. The transmitting device may transmit the one or more OAM multiplexed signals 325 to a receiving device, where the OAM receiver UCA antennas 310 of the receiving device may spread the one or more OAM multiplexed signals.

Further, although shown in the example depicted in FIG. 3 as two modes (a first and a second mode) being transmitted by each UCA circle 315, each UCA circle 315 may transmit any number of OAM transmissions according to any number of OAM modes. The number of OAM transmissions from each UCA circle 315 may be the same, different, or partially the same, such that all UCA circles 315 at a device may transmit the same number of transmissions, a different number of transmissions, or some UCA circles 315 may transmit the same number of transmissions while other UCA circles may transmit a different number of transmissions. Further, although each device is depicted in FIG. 3 as being configured with five UCA circles 315, a device may be configured with any number of UCA circles 315.

In some cases, as inter-circle OAM transmissions of the same mode may interfere with one another, a transmitting device may be configured to transmit a particular mode via a particular UCA circle 315 so as to mitigate interference caused by inter-circle OAM transmissions of the same mode. A transmitting device, or a receiving device, or both may be configured to determine a transmission scheme for the transmitting device that indicates which UCA circle 315 should be used to transmit which OAM mode. In some examples, the channel gains of OAM transmission streams may be different from each UCA circle 315 for each OAM mode for a set of parameters. The parameters may include system parameters such as a communication distance between a transmitting device and a receiving device, the radius of each transmitter UCA circle 315, the radius of each receiver UCA circle 315, carrier frequency, number of antenna elements 330 in each UCA circle 315. For example, for a set of system parameters (in which the parameters are held constant), an OAM mode of 2 or −2 may have a largest channel gain when transmitted via a UCA transmitter circle radius of 0.8 meters. In another example, for the same set of system parameters, an OAM mode of 1 or −1 may have a largest channel gain when transmitted via a UCA transmitter circle radius of 0.6 meters. In another example, for the same set of system parameters, an OAM mode of 0 may have a largest channel gain when transmitted via a UCA transmitter circle radius of 0.2 meters. Therefore, to achieve high data throughput, a transmitting device may be configured to transmit an OAM transmission via an OAM mode-UCA circle pairing that results in a large (or largest) channel gain.

As described herein, a device that includes OAM transmitter UCA antennas 305 (e.g., a UE 115, a base station 105, a first device 205-*a*) may select a set of primary OAM modes and a set of secondary OAM modes. In some examples, at least one primary OAM mode of the set of primary OAM modes may be activated periodically, and at least one secondary OAM mode of the set of secondary OAM modes may be activated based on a trigger. Additionally, the device that includes the OAM transmitter UCA antennas 305 may transmit a message to a device that includes OAM receiver UCA antennas 310 (e.g., a UE 115, a base station 105, a second device 210-*a*) indicating a configuration for the selected sets of primary and secondary OAM modes and for DRX parameters for each of the sets. In some cases, the device that includes the OAM receiver UCA antennas 310 may monitor for a signal using the at least one primary OAM mode in accordance with the DRX parameters for the set of primary OAM modes, and the device may activate a second OAM mode based on receiving the signal.

Figure 4:
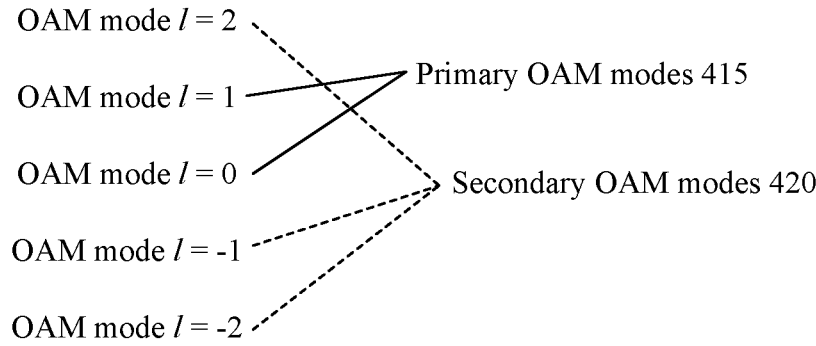
FIGS. 4 and 5 illustrate examples of DRX configurations that support multimode DRX in OAM communications in accordance with aspects of the present disclosure.
Figure 4:
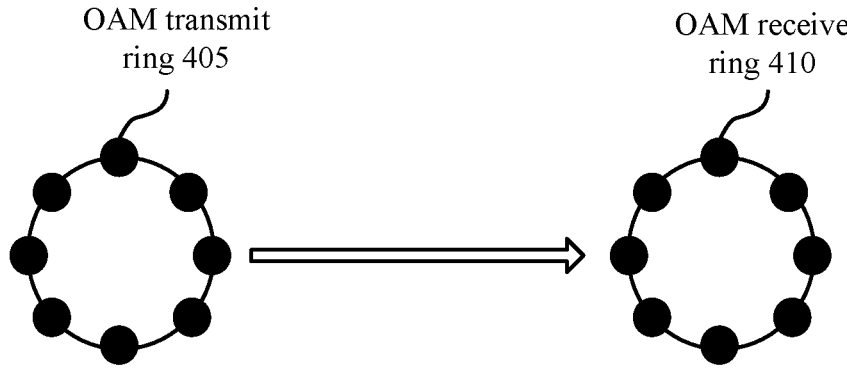
Figure 4:
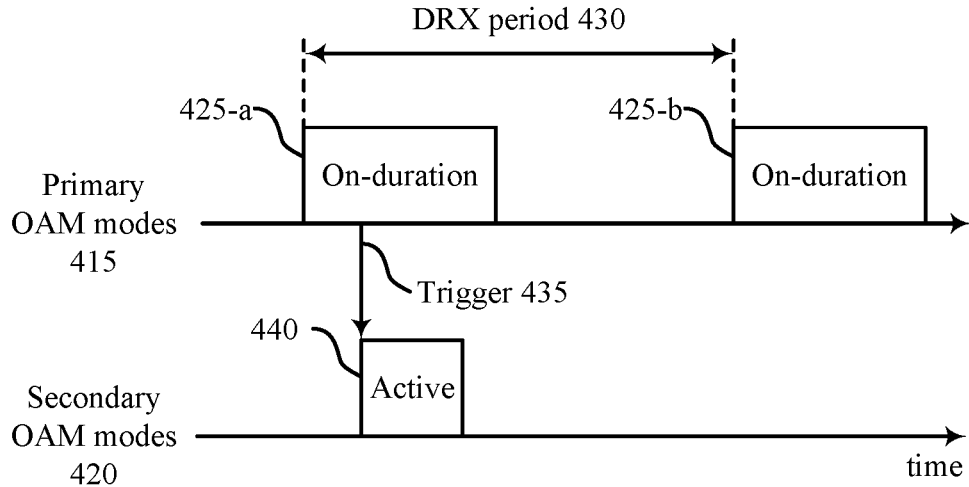

FIG. 4 illustrates an example of a multimode DRX configuration 400 that supports multimode DRX in OAM communications in accordance with aspects of the present disclosure. In some examples, multimode DRX configuration 400 may implement aspects of wireless communications system 100 or 200. In this example, a transmitting device (e.g., a UE, a base station, a first device) may include an OAM transmit ring 405 and a receiving device (e.g., a UE, a base station, a second device) may include an OAM receive ring 410.

As described herein, a device may be configured with an OAM antenna ring (e.g., a single-ring or multi-ring UCA antenna) to realize OAM-based communications using multiple OAM modes, such as primary OAM modes 415 and secondary OAM modes 420. For example, a transmitting device (e.g., a UE, a base station, a first device) may use the OAM transmit ring 405 to perform OAM communications with a receiving device (e.g., a UE, a base station, a second device) which may use the OAM receive ring 410. In such cases, multiple OAM modes l (e.g., five OAM modes, where l=−2, −1, 0, 1, 2) may be used for communications between the transmitting device and the receiving device. One or more of the OAM modes may be selected as primary OAM modes 415 (e.g., OAM modes l=1, l=0) and one or more of the OAM modes may be selected as secondary OAM modes 420 (e.g., OAM modes l=−2, l=−1, l=2).

For DRX operations at the receiving device, the primary OAM modes 415 may enter an on-duration 425 periodically. For example, a primary OAM mode of the primary OAM modes 415 may enter an on-duration 425-*a* that lasts for a duration of time. After a DRX period 430 (e.g., which may be preconfigured for the primary OAM modes 415 by the transmitting device corresponding to the OAM transmit ring 405), the primary OAM mode may enter an on-duration 425-*b*. During the DRX period 430 (e.g., a DRX cycle between the on-durations 425), the primary OAM modes 415 may be in a period of inactivity. In some examples, an inactivity timer may be configured for the primary OAM modes 415, where the receiving device may start the inactivity timer after a signal (e.g., a PDCCH) is received, and the receiving device may stay awake until the inactivity timer expires. The inactivity timer may have some duration (e.g., a number of TTIs, a number of slots, a number of subframes, a quantity of time) that is configured for the primary OAM modes 415.

In some examples, the secondary OAM modes 420 may enter an on-duration based on a trigger 435, which may be based on signaling received by the receiving device while using the primary OAM modes 415 (e.g., during the on-duration 425-*a*). For example, the receiving device may monitor for a signal from the transmitting device using at least one primary OAM mode of the primary OAM modes 415 in accordance with a set of DRX parameters corresponding to the primary OAM modes 415. As such, the receiving device may monitor for the signal during the on-durations 425 based on the DRX period 430.

In some examples, the transmitting device may determine, for each primary OAM mode of the primary OAM modes 415, a start position of the on-duration 425 (e.g., on-duration 425-*a*, 425-*b*), a length of the on-duration 425, and a length of an inactivity timer, which each may be included in the DRX parameters for the primary OAM modes 415. The on-duration 425 may correspond to a time period during which at least one primary OAM mode of the primary OAM modes 415 is activated in accordance with the DRX period 430 (e.g., a DRX cycle), and the inactivity timer for the primary OAM mode may correspond to a time duration after which the at least one primary OAM mode is deactivated based on an absence of signaling. Additionally or alternatively, the transmitting device may determine a length of an inactivity timer for each secondary OAM mode of the secondary OAM modes 420, which may be included in the DRX parameters for the secondary OAM modes 420. The inactivity timer for the secondary OAM modes 420 may correspond to a time duration after which at least one secondary OAM mode of the secondary OAM modes 420 is deactivated based on the absence of signaling.

In some cases, the receiving device may receive the signal from the transmitting device based on monitoring for the signal using the primary OAM mode (e.g., during the on-duration 425-*a*). The signal may indicate scheduled data for a secondary OAM mode of the secondary OAM modes 420. In some cases, based on the received signal, the receiving device may activate the secondary OAM mode, where the scheduled data for the secondary OAM mode may include the trigger 435. That is, the secondary OAM modes may enter an active period 440 based on the trigger 435, where the trigger 435 may be signaled during the on-duration 425-*a* of the primary OAM modes 415. In some cases, the secondary OAM modes 420 may be configured with an inactivity timer that may different (e.g., shorter) than the inactivity timer for the primary OAM modes 415. In such cases, the receiving device may start the inactivity timer for the secondary OAM modes 420 after a signal is received for the secondary OAM modes 420, and the receiving device may leave the secondary OAM modes 420 active until the inactivity timer expires. The inactivity timer for the secondary OAM modes 420 may have some duration (e.g., a number of TTIs, a number of slots, a number of subframes, a quantity of time).

As an illustrative example, the device may receive a signal (e.g., a paging message, PDCCH, or the like) based on a configured DRX period 430 for the primary OAM modes 415, where the signal may indicate that a transmission (e.g., data) is to be received. The transmission may be associated with one or more of the primary OAM modes 415 or with one or more of the secondary OAM modes 420, or both. In some aspects, if the forthcoming transmission is associated with only the primary OAM modes 415, the secondary OAM modes 420 may remain inactive. In other cases, if the signaling indicates that the transmission to be received is associated with at least one secondary OAM mode 420, then the trigger 435 may indicate to the device to activate the corresponding secondary OAM mode(s) 420.

Figure 5:
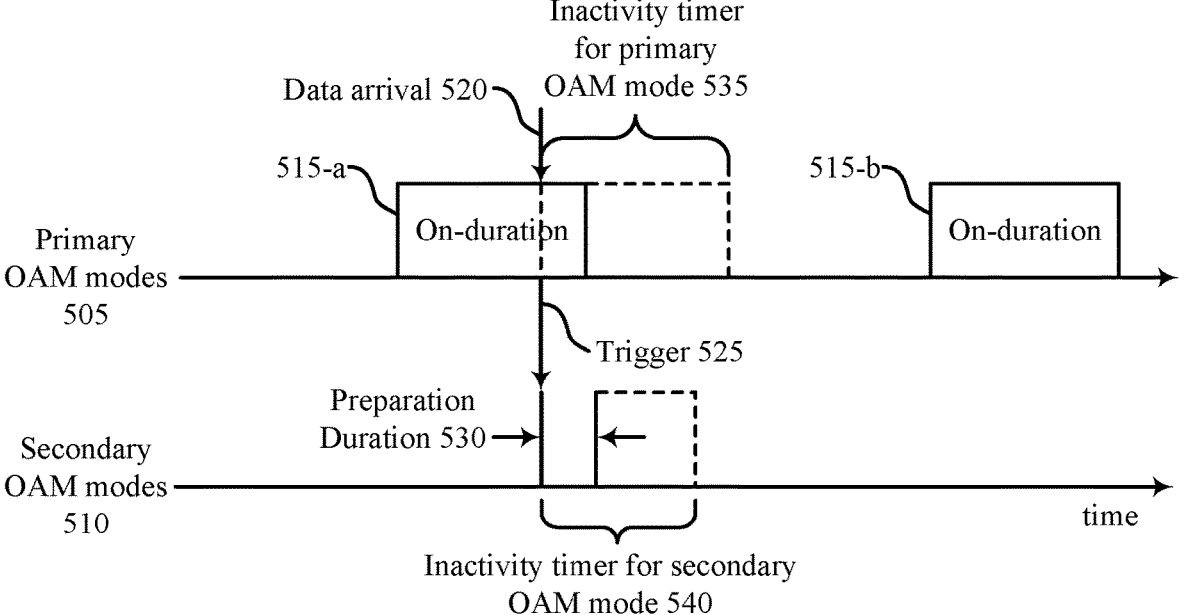

FIG. 5 illustrates an example of a DRX configuration 500 that supports multimode DRX in OAM communications in accordance with aspects of the present disclosure. In some examples, DRX configuration 500 may implement aspects of wireless communications system 100 or 200.

As described herein, a device may be configured with an OAM antenna ring (e.g., a single-ring or multi-ring UCA antenna) to realize OAM-based communications using multiple OAM modes, such as primary OAM modes 505 and secondary OAM modes 510. For example, a transmitting device (e.g., a UE, a base station, a first device) may use an OAM transmit ring to perform OAM communications with a receiving device (e.g., a UE, a base station, a second device), which may use an OAM receive ring.

The transmitting device may select the primary OAM modes 505 and the secondary OAM modes 510, and the transmitting device may transmit a message to the receiving device indicating a configuration for the selected primary OAM modes 505 and the selected secondary OAM modes 510, in addition to a set of DRX parameters for each of the primary OAM modes 505 and the secondary OAM modes 510. In some examples, the DRX parameters may include OAM mode-specific DRX operations. That is, DRX operations may be distinct for the primary OAM modes 505 and the secondary OAM modes 510. For example, the primary OAM modes 505 may have at least one on-duration 515, in which the receiving device is activated (e.g., wakes up) to monitor for a possible data transmission (e.g., monitor the layer 1 (L1) control channel for information).

As described with reference to FIG. 4, the primary OAM modes 505 may enter an on-duration 515 periodically. For example, a primary OAM mode of the primary OAM modes 505 may enter an on-duration 515-*a* that may last for a duration of time. After a period of inactivity, the primary OAM mode may enter an on-duration 515-*b*, and so on. In some examples, data 520 may arrive during the on-duration 515-*a*. Upon the data arrival and if a transmission including the secondary OAM modes 510 is scheduled, then the receiving device may begin operations for the secondary OAM modes 510 (e.g., OAM receive beamforming). That is, the secondary OAM modes 510 may become active based on a trigger 525, which may be based on the data 520 arriving at the receiving device.

Additionally or alternatively, the receiving device may indicate a preparation duration 530 of the secondary OAM modes 510 to the transmitting device. For example, the receiving device may signal, to the transmitting device, an indication of the preparation duration 530. The preparation duration 530 may be a duration of time shorter than a length of the inactivity timer 540 (e.g., less than 1 ms), and may depend on a capability of the receiving device (e.g., depending on whether the receiving device uses SPP-based or UCA-based OAM communications, based on a hardware configuration of the receiving device).

In some examples, an on-duration 515 may correspond to a time period during which at least one primary OAM mode of the primary OAM modes 505 is activated in accordance with a DRX cycle, and the inactivity timer 535 may correspond to a time duration after which the at least one primary OAM mode of the primary OAM modes 505 is deactivated based on an absence of signaling. That is, the receiving device may refrain from monitoring for signaling for the primary OAM modes 505 after the inactivity timer 535 expires. In addition, the inactivity timer 540 for the secondary OAM modes 510 may correspond to a time duration after which at least one secondary OAM mode of the secondary OAM modes 510 is deactivated based on the absence of signaling.

In some cases, the inactivity timers may start or restart as data 520 arrives at the receiving device. For example, an inactivity timer 535 for the primary OAM modes 505 may start upon the arrival of the data 520 and an inactivity timer 540 for the secondary OAM modes 510 may restart upon the arrival of the data 520. In some examples, the receiving device may monitor for a signal based on an on-duration 515 (e.g., the on-duration 515-*a*) and the length of the on-duration 515. That is, transmitting device may transmit signals (e.g., data) during the on-duration 515 for the primary OAM modes 505. In some examples, based on monitoring for and receiving the signal, the receiving device may start the inactivity timer 535 for the primary OAM modes 505. Additionally or alternatively, the receiving device may receive data from the transmitting device using at least one secondary OAM mode of the secondary OAM modes 510 based on the received signal. Based on receiving the data, the receiving device may start the inactivity timer 540 for the secondary OAM modes 510.

The length of the inactivity timer 540 for the secondary OAM modes 510 may be shorter than the length of the inactivity timer 535 for the primary OAM modes 505. In some examples, the preparation duration 530 may occur at the same time as the trigger 525, and therefore, prior to the restarting of the inactivity timer 540. Upon expiration of the on-duration 515-*a* or the inactivity timer 535 for the primary OAM modes 505, or upon the expiration of the inactivity timer 540 for the secondary OAM modes 510, the primary OAM modes 505 and the secondary OAM modes 510 of receiving device may be deactivated (e.g., may enter a sleep mode).

Figure 6:
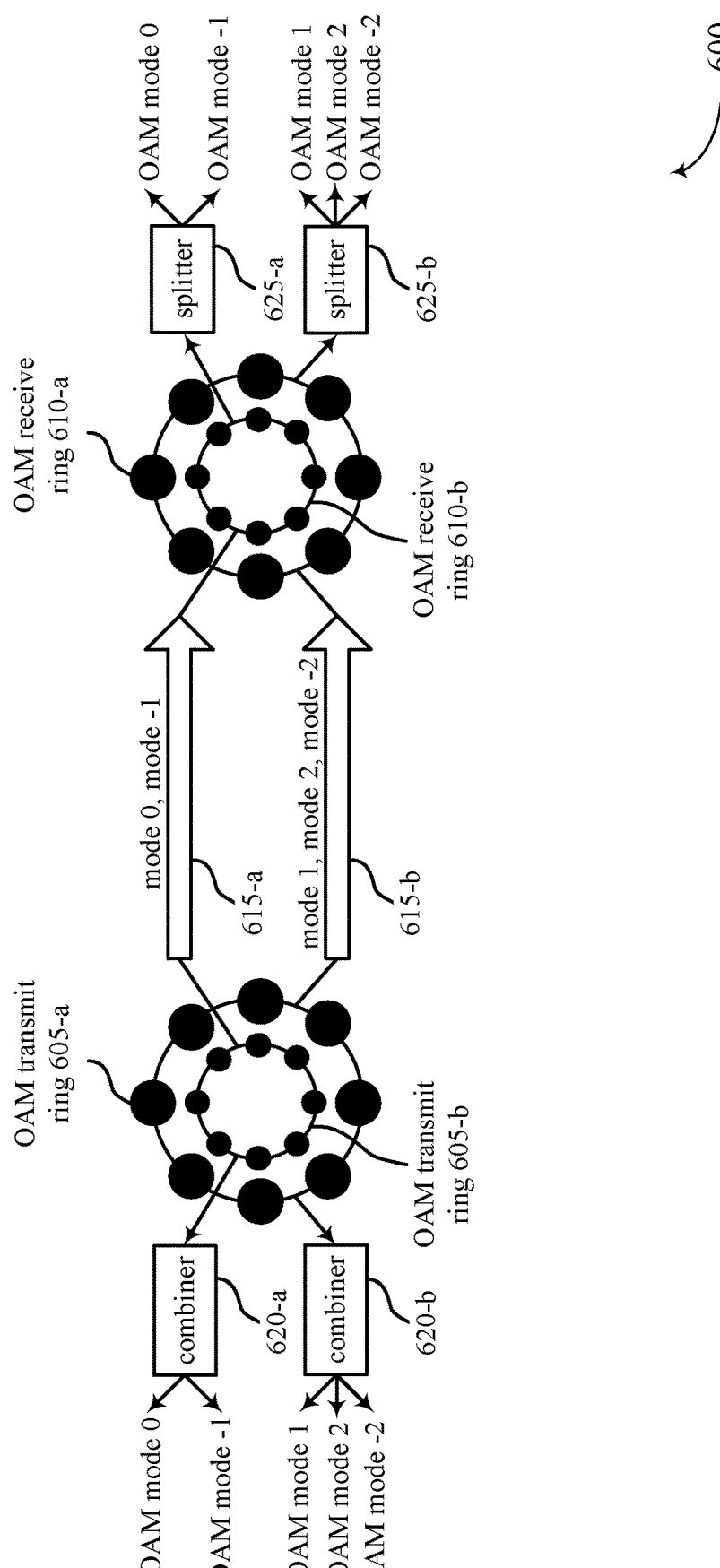
FIG. 6 illustrates an example of an OAM configuration that supports multimode DRX in OAM communications in accordance with aspects of the present disclosure.

FIG. 6 illustrates an example of an OAM configuration 600 that supports multimode DRX in OAM communications in accordance with aspects of the present disclosure. In some examples, OAM configuration 600 may implement aspects of wireless communications system 100 or 200. For example, the OAM configuration 600 may include a transmitting device (e.g., a UE, a base station, a first device) that may correspond to one or multiple OAM transmit rings 605, and a receiving device (e.g., a UE, a base station, a second device), which may use one or multiple OAM receive rings 610.

As described herein, a device may be configured with an OAM antenna ring (e.g., a single-ring or multi-ring UCA antenna) to realize OAM-based communications using multiple OAM modes, such as primary OAM modes and secondary OAM modes. For example, a transmitting device (e.g., a UE, a base station, a first device) may use the one or multiple OAM transmit rings 605 to perform OAM communications with a receiving device (e.g., a UE, a base station, a second device), which may use the one or multiple OAM receive rings 610. As shown in FIG. 6, the transmitting device and the receiving device may use UCA-based OAM communications with multiple rings. For example, the transmitting device may communicate using an OAM transmit ring 605-*a* and an OAM transmit ring 605-*b*, and the receiving device may communicate using an OAM receive ring 610-*a* and an OAM receive ring 610-*b*.

In some examples, the receiving device may indicate a ring-mode mapping relation to the transmitting device. For example, the receiving device may receive a message indicating a relationship between each OAM mode and one or more rings of a UCA panel. The receiving device may indicate which OAM transmit rings 605 and which OAM receive rings 610 map to different primary OAM modes, secondary OAM modes, or both. In some examples, the OAM transmit ring 605-*a* and the OAM receive ring 610-*a* (e.g., ring 1, inner ring) may map to an OAM mode 0 (e.g., a primary OAM mode) and an OAM mode-1 (e.g., a secondary OAM mode). In addition, the OAM transmit ring 605-*b* and the OAM receive ring 610-*b* (e.g., ring 2, outer ring) may map to an OAM mode 1 (e.g., a primary OAM mode), an OAM mode 2 (e.g., a secondary OAM mode), and an OAM mode-2 (e.g., a secondary OAM mode).

In some cases, the transmitting device may determine the division of primary OAM modes and secondary OAM modes based on the indication of the ring-mode mapping relation. For example, based on the indication of the relationship, the transmitting device may select a set of one or more primary OAM modes and a set of one or more secondary OAM modes. The quantity of primary OAM modes that are selected may depend on how many OAM rings (e.g., OAM transmit rings 605, OAM receive rings 610) may perform immediate transmissions. As such, some OAM rings may be more likely to be receiving, and as such those may be associated with the primary OAM modes. In some cases, the transmitting device may select one primary OAM mode for each ring. For example, the transmitting device may select a first primary OAM mode corresponding to a first ring of the one or more rings (e.g., the OAM mode 0 for the OAM transmit ring 605-*a* and the OAM receive ring 610-*a*) and a second primary OAM mode corresponding to a second ring (e.g., the OAM mode 1 for the OAM transmit ring 605-*b* and the OAM receive ring 610-*b*) based on the ring-mode mapping relation, where the first ring and the second ring are different. Additionally or alternatively, the transmitting device may select at least one secondary OAM mode for each ring based on the ring-mode mapping relation. For example, the transmitting device may select a first subset of one or more secondary OAM modes that correspond to the first ring (e.g., the OAM mode-1 for the OAM transmit ring 605-*a* and the OAM receive ring 610-*a*) and a second subset of one or more secondary OAM modes that correspond to the second ring (e.g., the OAM mode 2 and the OAM mode-2 for the OAM transmit ring 605-*b* and the OAM receive ring 610-*b*).

The transmitting device and the receiving device may perform OAM communications using the respective OAM rings and the OAM modes selected for each ring. For example, the transmitting device may transmit signaling corresponding to the primary OAM mode 0 and the secondary OAM mode-1 over a communications link 615-*a*. The signaling may be transmitted using the OAM transmit ring 605-*a* and received at the receiving device using the OAM receive ring 610-*a*. In addition, the transmitting device may transmit signaling corresponding to the primary OAM mode 1 and the secondary OAM modes 2 and −2 over a communications link 615-*b*. The signaling may be transmitted using the OAM transmit ring 605-*b* and received at the receiving device using the OAM receive ring 610-*b*. In some examples, the transmitting device may use a combiner 620-*a* for the OAM transmit ring 605-*a* and a combiner 620-*b* for the OAM transmit ring 605-*b*, while the receiving device may use a splitter 625-*a* for the OAM receive ring 610-*a* and a splitter 625-*b* for the OAM receive ring 610-*b* to process the signaling. As such, by selecting one primary OAM mode for each ring, the transmitting device may save power by switching off a particular combiner 620 and a particular splitter 625 when the secondary OAM modes may be deactivated. For example, if the secondary OAM mode 2 is deactivated, the transmitting device may switch off the combiner 620-*b* and the splitter 625-*b* associated with secondary OAM mode 2.

Figure 7:
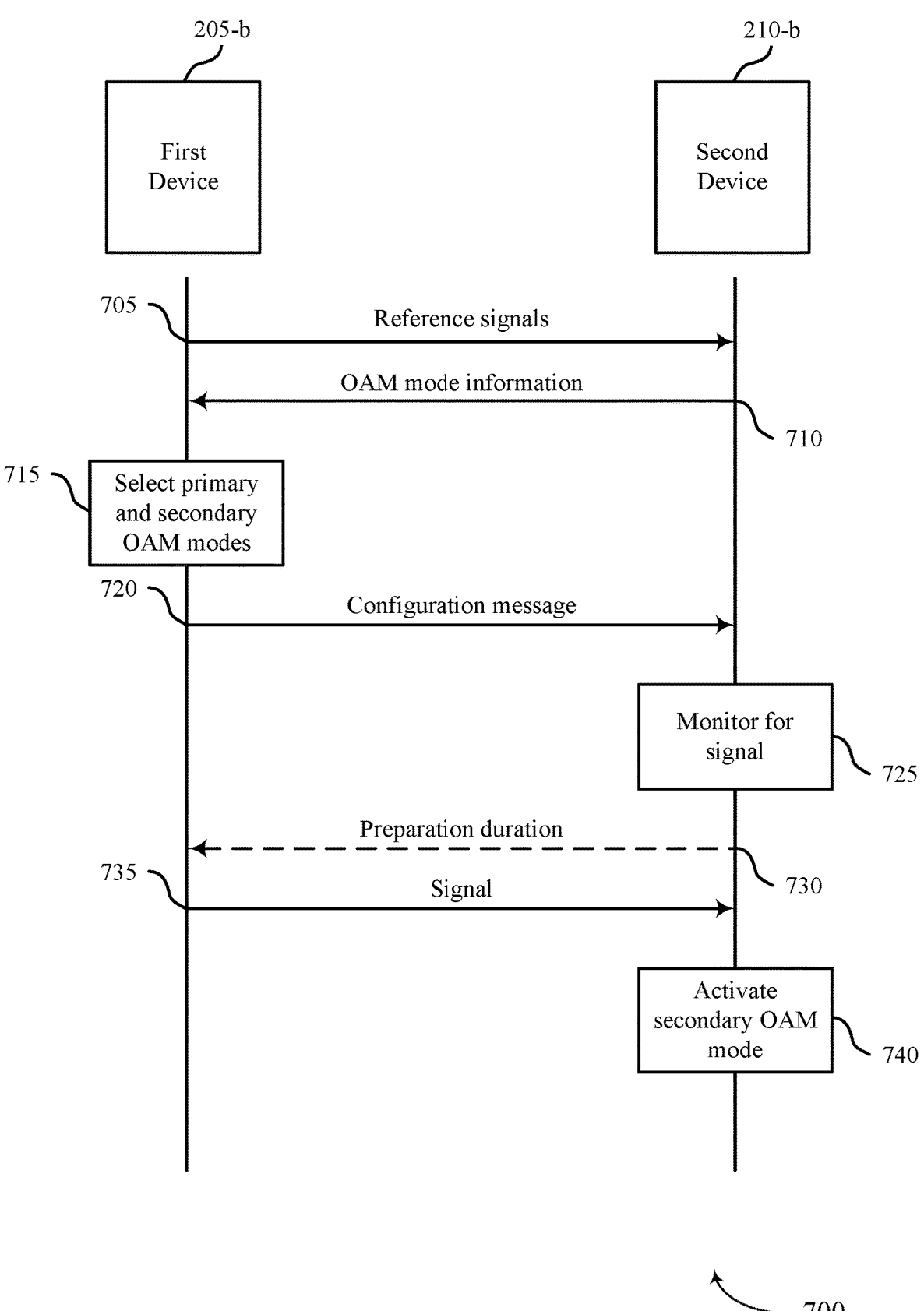
FIG. 7 illustrates an example of a process flow in a system that supports multimode DRX in OAM communications in accordance with aspects of the present disclosure.

FIG. 7 illustrates an example of a process flow 700 in a system that supports multimode DRX in OAM communications in accordance with aspects of the present disclosure. The process flow 700 may implement aspects of wireless communications systems 100 and 200, or may be implemented by aspects of the wireless communications system 100 and 200. For example, the process flow 700 may illustrate operations between a first device 205-*b* and a second device 210-*b*, which may be examples of corresponding devices described herein. In the following description of the process flow 700, the operations between the first device 205-*b* and the second device 210-*b* may be transmitted in a different order than the example order shown, or the operations performed by the first device 205-*b* and the second device 210-*b* may be performed in different orders or at different times. Some operations may also be omitted from the process flow 700, and other operations may be added to the process flow 700.

At 705, the first device 205-*b* (e.g., a transmitting device, a UE, a base station) may transmit, to the second device 210-*b* (e.g., a receiving device, a UE, a base station), one or more reference signals corresponding to multiple OAM modes. In some examples, the second device 210-*b* may perform a measurement of the one or more reference signals to determine a respective index and a respective channel status for one or more OAM modes.

At 710, the first device 205-*b* may receive, from the second device 210-*b*, a message indicating a respective index and a respective channel status for one or more OAM modes of the multiple OAM modes based on the one or more reference signals. Additionally or alternatively, the first device 205-*b* may receive an indication of a relationship (e.g., a ring-mode mapping relation) between each OAM mode and one or more rings of UCA panels corresponding to the first device 205-*b* and the second device 210-*b*.

At 715, the first device 205-*b* may select, from the multiple OAM modes, a set of one or more primary OAM modes and a set of one or more secondary OAM modes. In some cases, at least one primary OAM mode of the set of one or more primary OAM modes may be activated periodically, and at least one secondary OAM mode of the set of one or more secondary OAM modes may be activated based on a trigger. The first device 205-*b* may select the sets of primary and secondary OAM modes based on the ring-mode mapping relation, based on the reference signals and corresponding channel measurements, or any combination thereof.

At 720, the first device 205-*b* may transmit, to the second device 210-*b*, a message indicating a configuration for the selected set of one or more primary OAM modes, the selected set of one or more secondary OAM modes, and DRX parameters for each of the set of one or more primary OAM modes and the set of one or more secondary OAM modes based on the selecting. In some examples, the DRX parameters may include a start position of an on-duration, a length of the on-duration, and a length of an inactivity timer for the primary OAM modes, and a length of an inactivity timer for the secondary OAM modes.

At 725, the second device 210-*b* may monitor for a signal using the at least one primary OAM mode in accordance with the DRX parameters for the set of one or more primary OAM modes. For example, the second device 210-*b* may monitor for the signal during an on-duration for the at least one primary OAM mode and the second device 210-*b* may refrain from monitoring for the signal during periods of inactivity outside of the on-duration.

At 730, the first device 205-*b* may receive, from the second device 210-*b*, an indication of a preparation duration for the at least one secondary OAM mode from the set of secondary OAM modes. The preparation duration may occur prior to the trigger which may activate the secondary OAM modes.

At 735, the first device 205-*b* may transmit, to the second device 210-*b*, a signal (e.g., data) based on the preparation duration, the selected set of one or more primary OAM modes, the selected set of one or more secondary OAM modes, and the DRX parameters for each of the sets of OAM modes. In some examples, the signal may indicate scheduled data for the at least one secondary OAM mode.

At 740, the second device 210-*b* may activate the at least one secondary OAM mode from the set of secondary OAM modes based on the received signal, where the scheduled data for the at least one secondary OAM mode may include the trigger.

Figure 8:
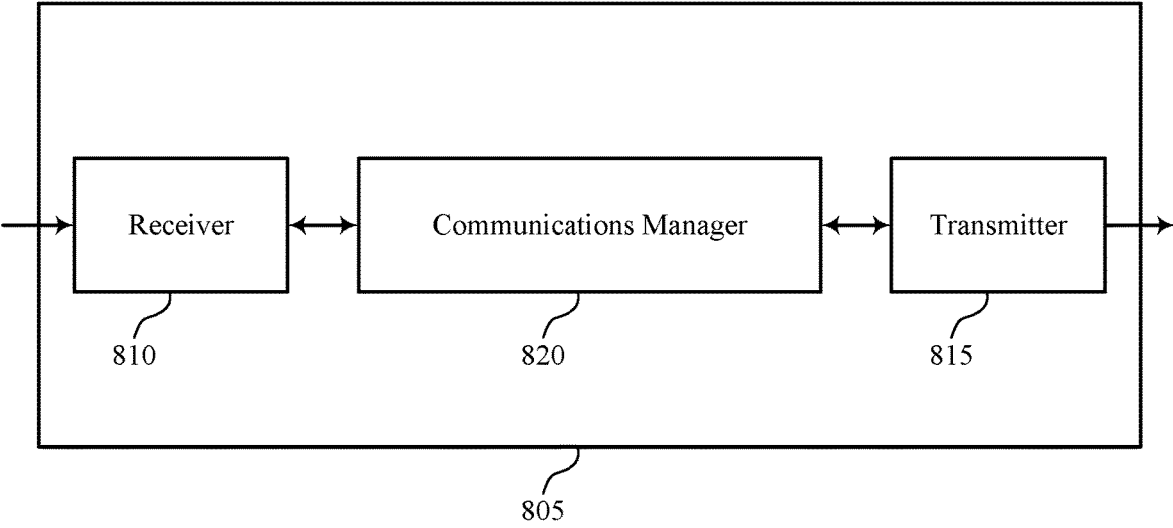
FIGS. 8 and 9 show block diagrams of devices that support multimode DRX in OAM communications in accordance with aspects of the present disclosure.

FIG. 8 shows a block diagram 800 of a device 805 that supports multimode DRX in OAM communications in accordance with aspects of the present disclosure. The device 805 may be an example of aspects of a first device (e.g., a wireless device, a base station, a UE, an IAB node) as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multimode DRX in OAM communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multimode DRX in OAM communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multimode DRX in OAM communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by the processor).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first device in accordance with examples as disclosed herein. For example, the communications manager 820 may be configured as or otherwise support a means for selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The communications manager 820 may be configured as or otherwise support a means for transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for multimode DRX in OAM communications, which may reduce power and resource (e.g., hardware) consumption and improve communication efficiency.

Figure 9:
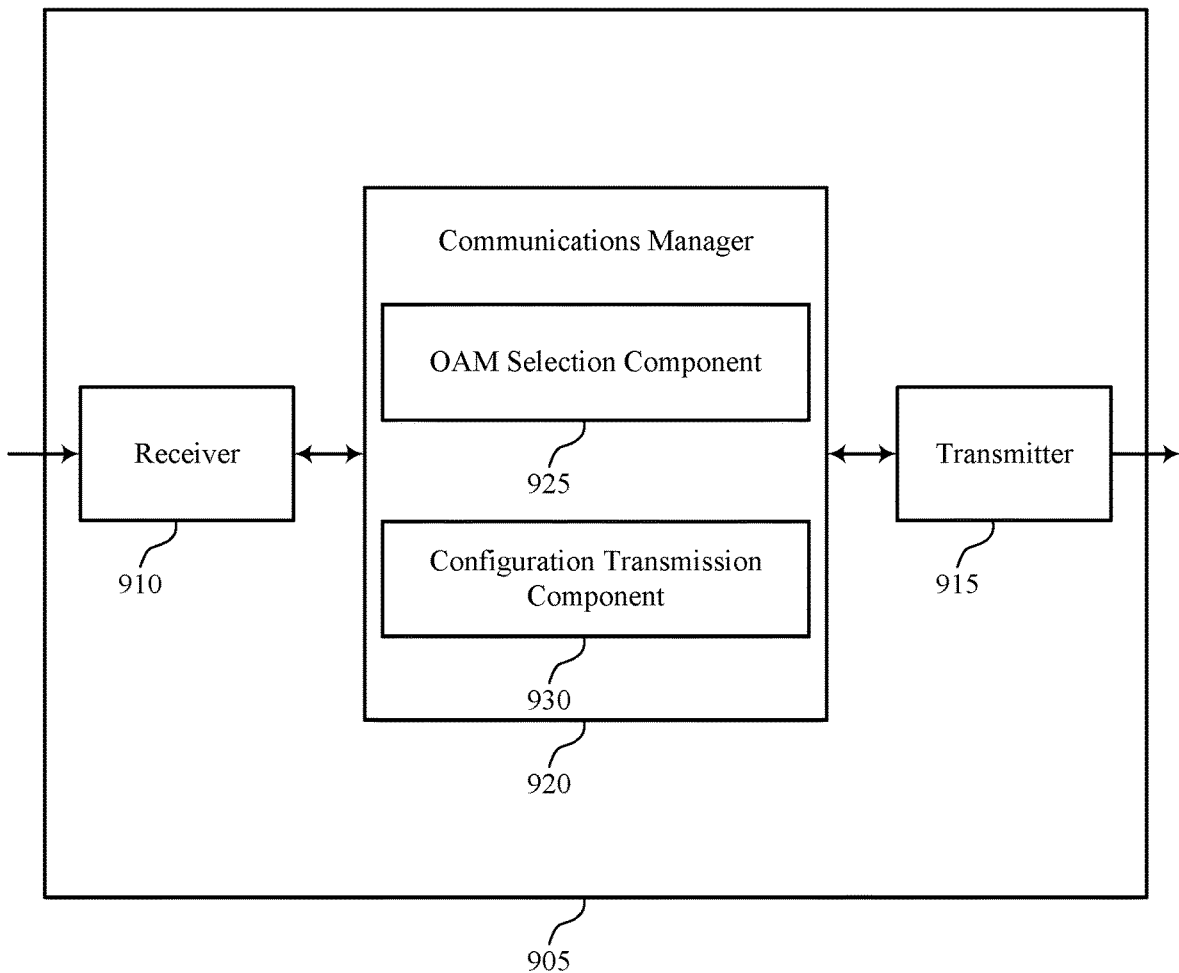

FIG. 9 shows a block diagram 900 of a device 905 that supports multimode DRX in OAM communications in accordance with aspects of the present disclosure. The device 905 may be an example of aspects of a device 805 or a first device as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multimode DRX in OAM communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multimode DRX in OAM communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multimode DRX in OAM communications as described herein. For example, the communications manager 920 may include a OAM selection component 925 a configuration transmission component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first device in accordance with examples as disclosed herein. The OAM selection component 925 may be configured as or otherwise support a means for selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The configuration transmission component 930 may be configured as or otherwise support a means for transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

Figure 10:
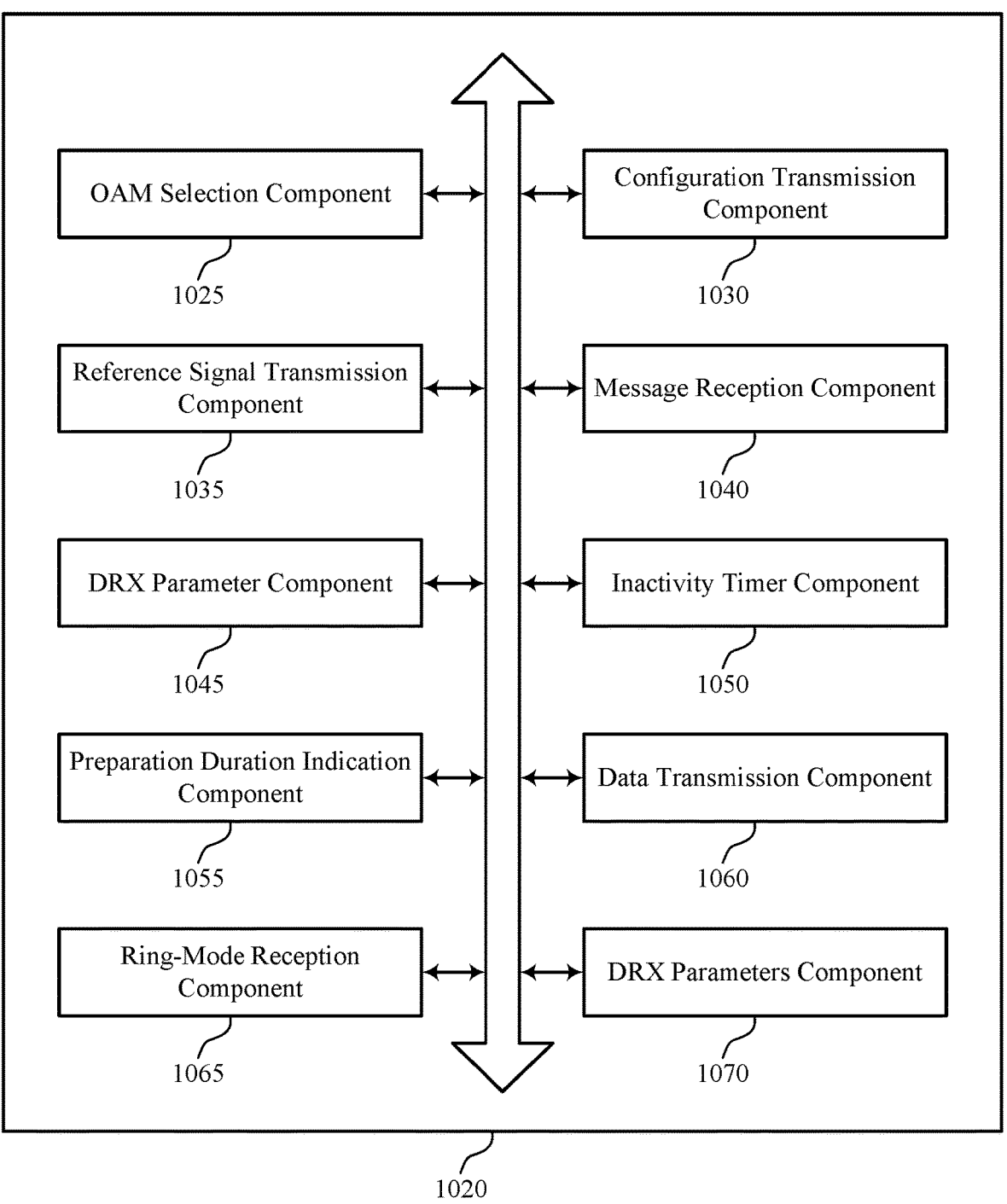
FIG. 10 shows a block diagram of a communications manager that supports multimode DRX in OAM communications in accordance with aspects of the present disclosure.

FIG. 10 shows a block diagram 1000 of a communications manager 1020 that supports multimode DRX in OAM communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of multimode DRX in OAM communications as described herein. For example, the communications manager 1020 may include a OAM selection component 1025, a configuration transmission component 1030, a reference signal transmission component 1035, a message reception component 1040, a DRX parameter component 1045, an inactivity timer component 1050, a preparation duration indication component 1055, a data transmission component 1060, a ring-mode reception component 1065, a DRX parameters component 1070, or any combination thereof. Each of these components may communicate, directly or indirectly, with one another (e.g., via one or more buses).

The communications manager 1020 may support wireless communication at a first device in accordance with examples as disclosed herein. The OAM selection component 1025 may be configured as or otherwise support a means for selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The configuration transmission component 1030 may be configured as or otherwise support a means for transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

In some examples, the reference signal transmission component 1035 may be configured as or otherwise support a means for transmitting, to the second device, one or more reference signals corresponding to the set of multiple OAM modes. In some examples, the message reception component 1040 may be configured as or otherwise support a means for receiving, from the second device, a second message indicating a respective index and a respective channel status for one or more OAM modes of the set of multiple OAM modes based on the one or more reference signals, where selecting the set of one or more primary OAM modes and the set of one or more secondary OAM modes is based on the second message.

In some examples, the ring-mode reception component 1065 may be configured as or otherwise support a means for receiving, within the second message, an indication of a relationship between each OAM mode and one or more rings of a UCA panel, where selecting the set of one or more primary OAM modes and the set of one or more secondary OAM modes is based on the indication of the relationship.

In some examples, to support selecting the set of one or more primary OAM modes and the set of one or more secondary OAM modes, the ring-mode reception component 1065 may be configured as or otherwise support a means for selecting a first primary OAM mode corresponding to a first ring of the one or more rings based on the relationship between each OAM mode and the one or more rings of the UCA panel. In some examples, to support selecting the set of one or more primary OAM modes and the set of one or more secondary OAM modes, the ring-mode reception component 1065 may be configured as or otherwise support a means for selecting a second primary OAM mode corresponding to a second ring of the one or more rings based on the relationship between each OAM mode and the one or more rings of the UCA panel, the second ring being different from the first ring.

In some examples, to support selecting the set of one or more primary OAM modes and the set of one or more secondary OAM modes, the ring-mode reception component 1065 may be configured as or otherwise support a means for selecting a first subset of one or more secondary OAM modes that corresponds to the first ring of the one or more rings based on the relationship between each OAM mode and the one or more rings of the UCA panel. In some examples, to support selecting the set of one or more primary OAM modes and the set of one or more secondary OAM modes, the ring-mode reception component 1065 may be configured as or otherwise support a means for selecting a second subset of one or more secondary OAM mode corresponding to the second ring of the one or more rings based on the relationship between each OAM mode and the one or more rings of the UCA panel.

In some examples, the DRX parameter component 1045 may be configured as or otherwise support a means for determining, for each primary OAM mode of the set of one or more primary OAM modes, a start position of an on-duration, a length of the on-duration, and a length of an inactivity timer, where the DRX parameters for the set of one or more primary OAM modes include the start position of the on-duration, the length of the on-duration, and the length of the inactivity timer.

In some examples, the on-duration corresponds to a time period during which the at least one primary OAM mode from the set of one or more primary OAM modes is activated in accordance with a DRX cycle, and where the inactivity timer corresponds to a time duration after which the at least one primary OAM mode from the set of one or more primary OAM modes is deactivated based on an absence of signaling.

In some examples, the inactivity timer for the set of one or more primary OAM modes is greater than an inactivity timer for the set of one or more secondary OAM modes.

In some examples, the inactivity timer corresponds to a time duration after which the at least one secondary OAM mode from the set of one or more secondary OAM modes is deactivated based on the absence of signaling.

In some examples, the inactivity timer component 1050 may be configured as or otherwise support a means for determining a length of an inactivity timer for each secondary OAM mode of the set of one or more secondary OAM modes, where the DRX parameters for the set of one or more secondary OAM modes include the length of the inactivity timer.

In some examples, the preparation duration indication component 1055 may be configured as or otherwise support a means for receiving, from the second device, an indication of a preparation duration for the at least one secondary OAM mode from the set of one or more secondary OAM modes. In some examples, the data transmission component 1060 may be configured as or otherwise support a means for transmitting data to the second device based on the preparation duration, the selected set of one or more primary OAM modes, the selected set of one or more secondary OAM modes, and the DRX parameters for each of the set of one or more primary OAM modes and the set of one or more secondary OAM modes.

Figure 11:
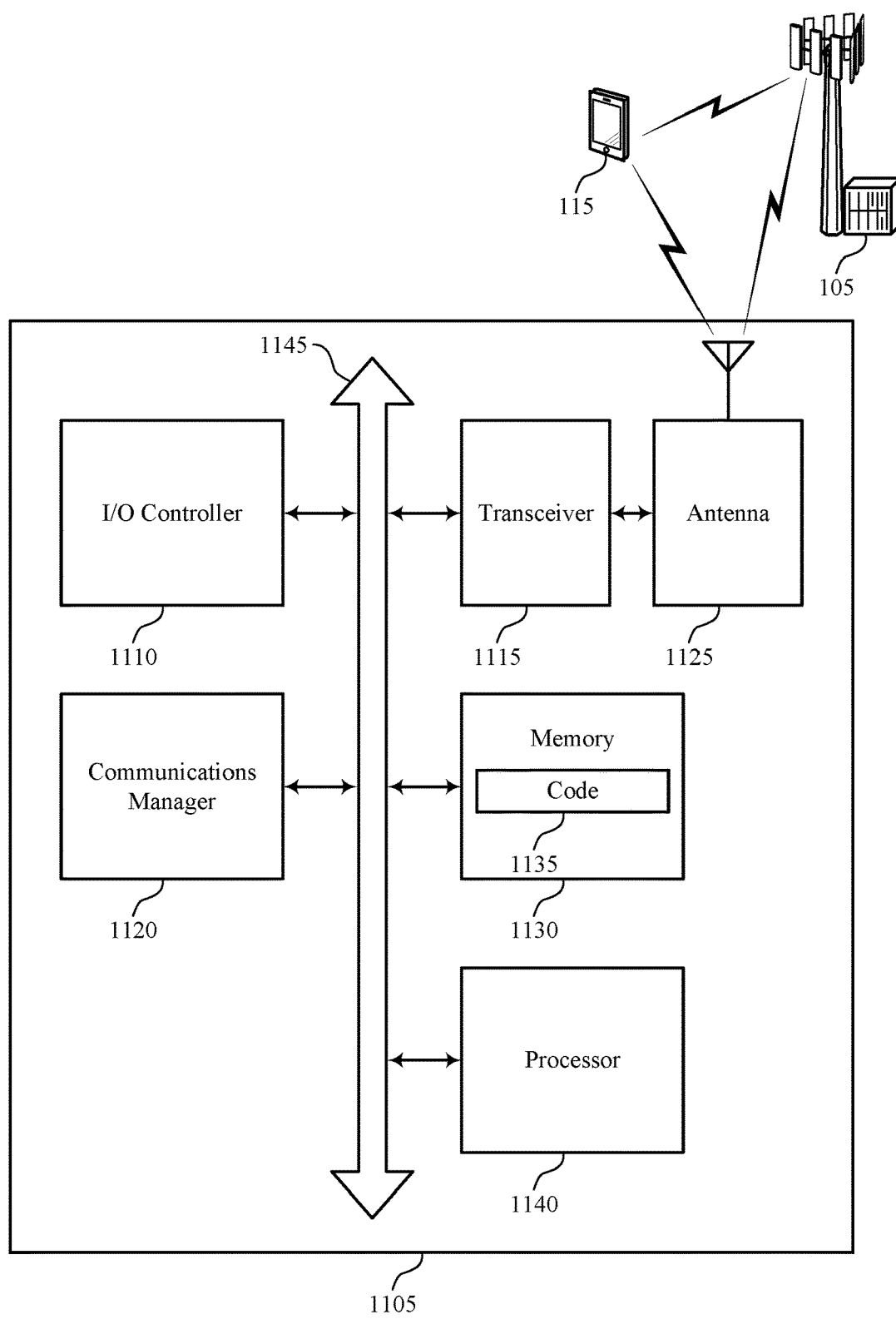
FIG. 11 shows a diagram of a system including a device that supports multimode DRX in OAM communications in accordance with aspects of the present disclosure.

FIG. 11 shows a diagram of a system 1100 including a device 1105 that supports multimode DRX in OAM communications in accordance with aspects of the present disclosure. The device 1105 may be an example of or include the components of a device 805, a device 905, or a first device (e.g., a wireless device, a base station, a UE, an IAB node), as described herein. The device 1105 may include components for bi-directional voice and data communications including components for transmitting and receiving communications, such as a communications manager 1120, an I/O controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random-access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic input/output system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multimode DRX in OAM communications). For example, the device 1105 or a component of the device 1105 may include a processor 1140 and memory 1130 coupled with the processor 1140, the processor 1140 and memory 1130 configured to perform various functions described herein.

The communications manager 1120 may support wireless communication at a first device in accordance with examples as disclosed herein. For example, the communications manager 1120 may be configured as or otherwise support a means for selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The communications manager 1120 may be configured as or otherwise support a means for transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting.

By including or configuring the communications manager 1120 in accordance with examples as described herein, the device 1105 may support techniques for multimode DRX in OAM communications, which may reduce power and resource (e.g., hardware) consumption and improve communication efficiency.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multimode DRX in OAM communications as described herein, or the processor 1140 and the memory 1130 may be otherwise configured to perform or support such operations.

Figure 12:
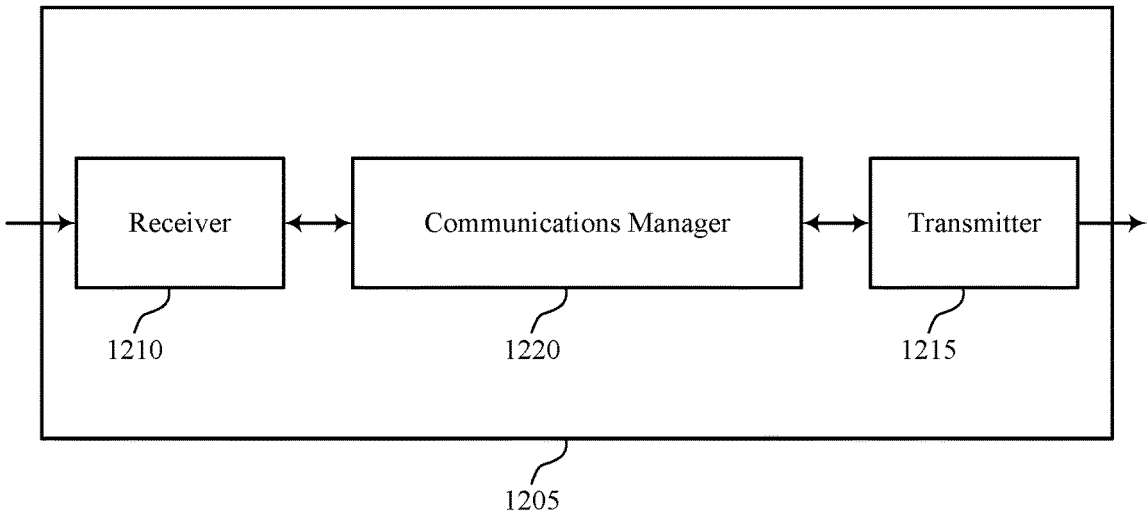
FIGS. 12 and 13 show block diagrams of devices that support multimode DRX in OAM communications in accordance with aspects of the present disclosure.

FIG. 12 shows a block diagram 1200 of a device 1205 that supports multimode DRX in OAM communications in accordance with aspects of the present disclosure. The device 1205 may be an example of aspects of a second device (e.g., a wireless device, a base station, a UE, an IAB node), as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to multimode DRX in OAM communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to multimode DRX in OAM communications). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of multimode DRX in OAM communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first device in accordance with examples as disclosed herein. For example, the communications manager 1220 may be configured as or otherwise support a means for receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary or OAM modes is activated based on a trigger. The communications manager 1220 may be configured as or otherwise support a means for monitoring for a signal using the at least one primary OAM mode in accordance with the DRX parameters for the set of one or more primary OAM modes.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for multimode DRX in OAM communications, which may reduce power and resource (e.g., hardware) consumption and improve communication efficiency.

Figure 13:
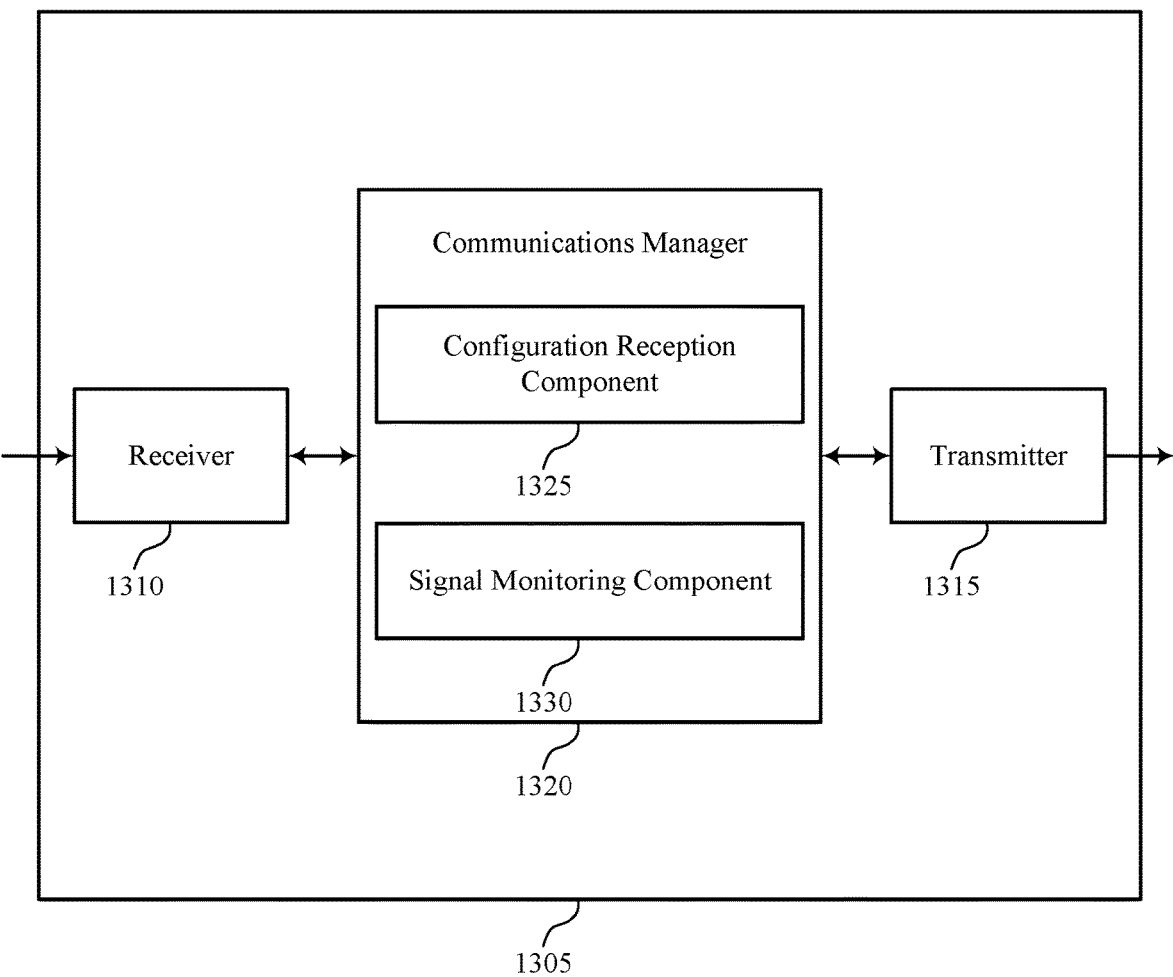
Figure 13:

FIG. 13 shows a block diagram 1300 of a device 1305 that supports multimode DRX in OAM communications in accordance with aspects of the present disclosure. The device 1305 may be an example of aspects of a device 1205 or a second device as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to multimode DRX in OAM communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to multimode DRX in OAM communications). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of multimode DRX in OAM communications as described herein. For example, the communications manager 1320 may include a configuration reception component 1325 a signal monitoring component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first device in accordance with examples as disclosed herein. The configuration reception component 1325 may be configured as or otherwise support a means for receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger. The signal monitoring component 1330 may be configured as or otherwise support a means for monitoring for a signal using the at least one primary OAM mode in accordance with the DRX parameters for the set of one or more primary OAM modes.

Figure 14:
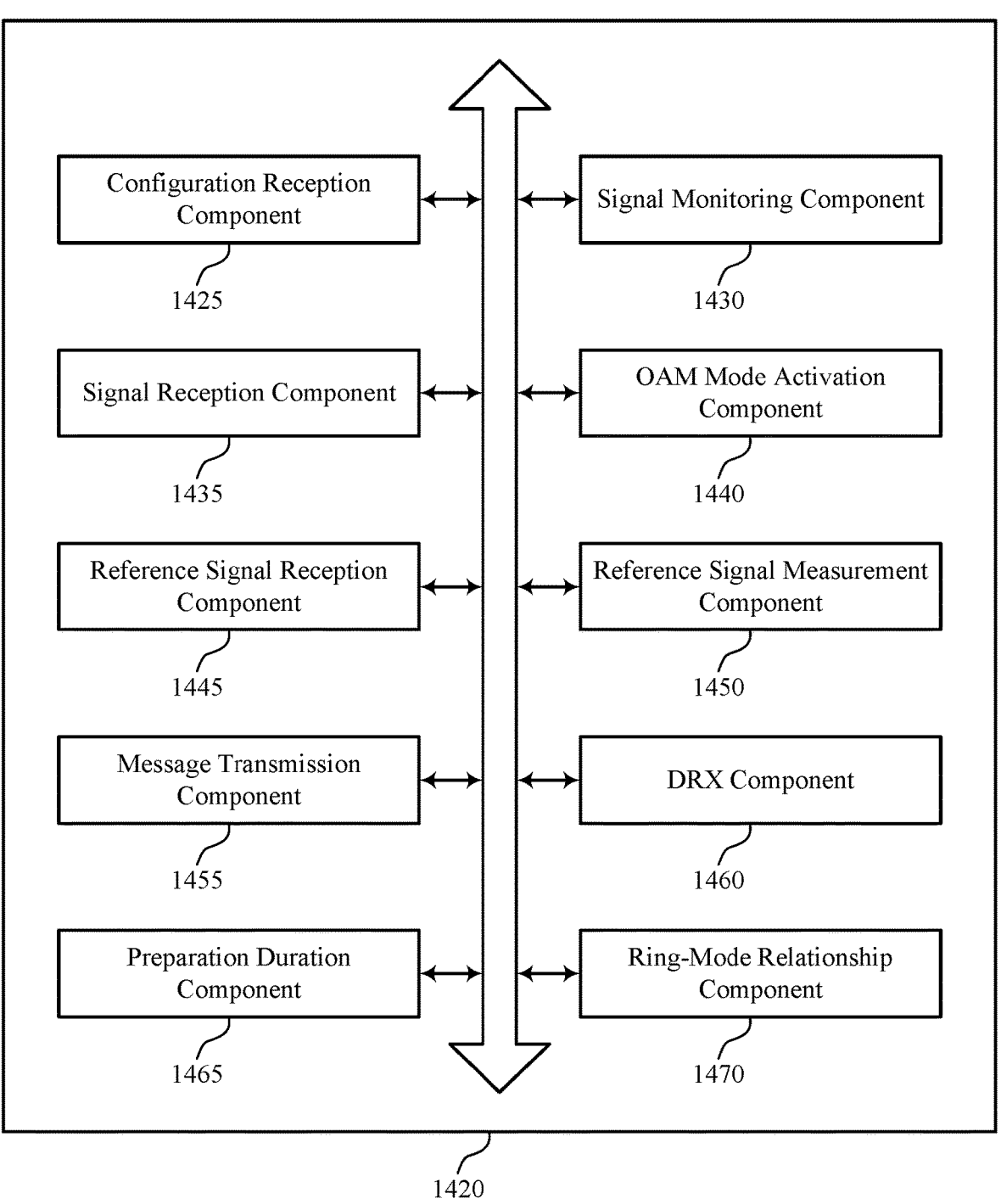
FIG. 14 shows a block diagram of a communications manager that supports multimode DRX in OAM communications in accordance with aspects of the present disclosure.

FIG. 14 shows a block diagram 1400 of a communications manager 1420 that supports multimode DRX in OAM communications in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of multimode DRX in OAM communications as described herein. For example, the communications manager 1420 may include a configuration reception component 1425, a signal monitoring component 1430, a signal reception component 1435, a OAM mode activation component 1440, a reference signal reception component 1445, a reference signal measurement component 1450, a message transmission component 1455, a DRX component 1460, a preparation duration component 1465, a ring-mode relationship component 1470, or any combination thereof. Each of these components may communicate, directly or indirectly, with one another (e.g., via one or more buses).

The communications manager 1420 may support wireless communication at a first device in accordance with examples as disclosed herein. The configuration reception component 1425 may be configured as or otherwise support a means for receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger. The signal monitoring component 1430 may be configured as or otherwise support a means for monitoring for a signal using the at least one primary OAM mode in accordance with the DRX parameters for the set of one or more primary OAM modes.

In some examples, the signal reception component 1435 may be configured as or otherwise support a means for receiving the signal from the second device based on the monitoring using the at least one primary OAM mode, the received signal indicating scheduled data for the at least one secondary OAM mode. In some examples, the OAM mode activation component 1440 may be configured as or otherwise support a means for activating the at least one secondary OAM mode from the set of one or more secondary OAM modes based on the received signal, where the scheduled data for the at least one secondary OAM mode includes the trigger.

In some examples, the reference signal reception component 1445 may be configured as or otherwise support a means for receiving, from the second device, one or more reference signals corresponding to the set of multiple OAM modes. In some examples, the reference signal measurement component 1450 may be configured as or otherwise support a means for determining, based on a measurement of the one or more reference signals, a respective index and a respective channel status for one or more OAM modes of the set of multiple OAM modes. In some examples, the message transmission component 1455 may be configured as or otherwise support a means for transmitting, to the second device, a second message indicating the respective index and the respective channel status for the one or more OAM modes, where the set of one or more primary OAM modes and the set of one or more secondary OAM modes are based on the second message.

In some examples, the ring-mode relationship component 1470 may be configured as or otherwise support a means for determining a relationship between each OAM mode and one or more rings of a UCA panel. In some examples, the ring-mode relationship component 1470 may be configured as or otherwise support a means for transmitting, within the second message, an indication of the relationship between each OAM mode and the one or more rings of the UCA panel, where the set of one or more primary OAM modes and the set of one or more secondary OAM modes are based on the relationship.

In some examples, the set of one or more primary OAM modes includes a first primary OAM mode corresponding to a first ring of the one or more rings and a second primary OAM mode corresponding to a second ring of the one or more rings, the second ring being different from the first ring, and where the first primary OAM mode and the second primary OAM mode are based on the relationship between each OAM mode and the one or more rings of the UCA panel.

In some examples, the set of one or more secondary OAM modes includes a first subset of secondary OAM modes corresponding to a first ring of the one or more rings and a second subset of secondary OAM modes corresponding to a second ring of the one or more rings, the second ring being different from the first ring, and where the first subset of secondary OAM modes and the second subset of secondary OAM modes are based on the relationship between each OAM mode and the one or more rings of the UCA panel.

In some examples, the DRX parameters for the set of one or more primary OAM modes include a start position of an on-duration, a length of the on-duration, a length of an inactivity timer, or any combination thereof.

In some examples, the on-duration corresponds to a time period during which the at least one primary OAM mode is activated in accordance with a DRX cycle, and where the inactivity timer corresponds to a time duration after which the at least one primary OAM mode is deactivated based on an absence of signaling.

In some examples, to support monitoring for the signal using the at least one primary OAM mode, the signal monitoring component 1430 may be configured as or otherwise support a means for monitoring for the signal based on the on-duration and the length of the on-duration. In some examples, to support monitoring for the signal using the at least one primary OAM mode, the DRX component 1460 may be configured as or otherwise support a means for starting the inactivity timer for the at least one primary OAM mode based on receiving the signal from the second device.

In some examples, the signal reception component 1435 may be configured as or otherwise support a means for receiving data from the second device using the at least one secondary OAM mode based on receiving the signal from the second device.

In some examples, the DRX component 1460 may be configured as or otherwise support a means for starting an inactivity timer for the at least one secondary OAM mode based on receiving the data from the second device.

In some examples, the inactivity timer for the at least one primary OAM mode is greater than the inactivity timer for the at least one secondary OAM mode.

In some examples, the OAM mode activation component 1440 may be configured as or otherwise support a means for deactivating the at least one primary OAM mode from the set of one or more primary OAM modes, the at least one secondary OAM mode from the set of one or more secondary OAM modes, or both based on an expiration of the on-duration for the at least one primary OAM mode, an expiration of the inactivity timer for the at least one secondary OAM mode, or both.

In some examples, the DRX parameters for the set of one or more secondary OAM modes include a length of an inactivity timer. In some examples, the inactivity timer corresponds to a time duration after which the at least one secondary OAM mode from the set of one or more secondary OAM modes is deactivated based on an absence of signaling.

In some examples, the preparation duration component 1465 may be configured as or otherwise support a means for transmitting, to the second device, an indication of a preparation duration for the at least one secondary OAM mode from the set of one or more secondary OAM modes. In some examples, the OAM mode activation component 1440 may be configured as or otherwise support a means for activating the at least one secondary OAM mode from the set of one or more secondary OAM modes in accordance with the preparation duration.

Figure 15:
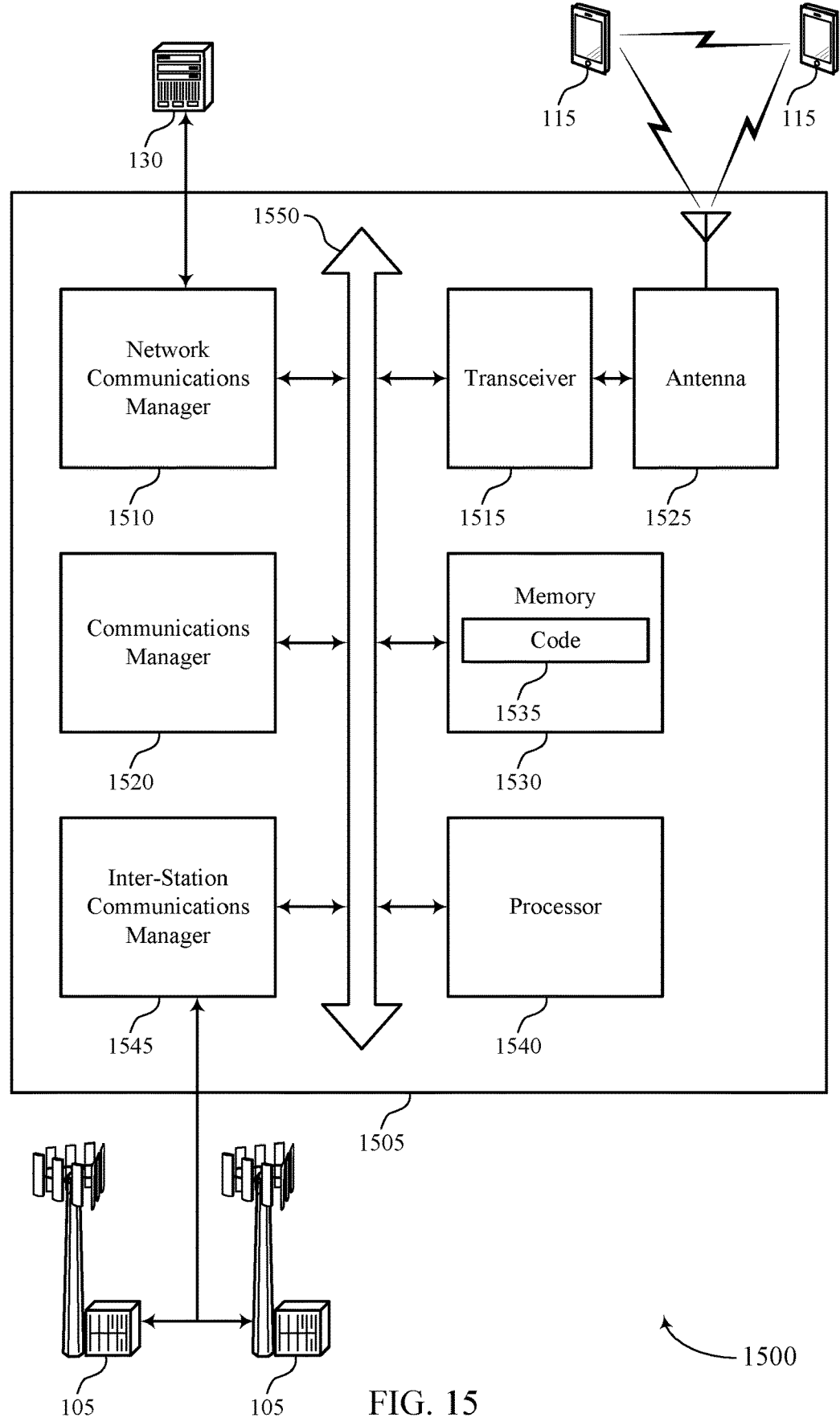
FIG. 15 shows a diagram of a system including a device that supports multimode DRX in OAM communications in accordance with aspects of the present disclosure.

FIG. 15 shows a diagram of a system 1500 including a device 1505 that supports multimode DRX in OAM communications in accordance with aspects of the present disclosure. The device 1505 may be an example of or include the components of a device 1205, a device 1305, or a second device (e.g., a wireless device, a base station, a UE, an IAB node), as described herein. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting multimode DRX in OAM communications). For example, the device 1505 or a component of the device 1505 may include a processor 1540 and memory 1530 coupled with the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a first device in accordance with examples as disclosed herein. For example, the communications manager 1520 may be configured as or otherwise support a means for receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger. The communications manager 1520 may be configured as or otherwise support a means for monitoring for a signal using the at least one primary OAM mode in accordance with the DRX parameters for the set of one or more primary OAM modes.

By including or configuring the communications manager 1520 in accordance with examples as described herein, the device 1505 may support techniques for multimode DRX in OAM communications, which may reduce power and resource (e.g., hardware) consumption and improve communication efficiency.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of multimode DRX in OAM communications as described herein, or the processor 1540 and the memory 1530 may be otherwise configured to perform or support such operations.

FIG. 16 shows a flowchart illustrating a method 1600 that supports multimode DRX in OAM communications in accordance with aspects of the present disclosure. The operations of the method 1600 may be implemented by a first device or its components as described herein. For example, the operations of the method 1600 may be performed by a first device as described with reference to FIGS. 1 through 11. In some examples, a first device may execute a set of instructions to control the functional elements of the first device to perform the described functions. Additionally or alternatively, the first device may perform aspects of the described functions using special-purpose hardware.

At 1605, the method may include selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The operations of 1605 may be performed in accordance with examples as disclosed herein. In some examples, aspects of the operations of 1605 may be performed by a OAM selection component 1025 as described with reference to FIG. 10.

At 1610, the method may include transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting. The operations of 1610 may be performed in accordance with examples as disclosed herein. In some examples, aspects of the operations of 1610 may be performed by a configuration transmission component 1030 as described with reference to FIG. 10.

FIG. 17 shows a flowchart illustrating a method 1700 that supports multimode DRX in OAM communications in accordance with aspects of the present disclosure. The operations of the method 1700 may be implemented by a first device or its components as described herein. For example, the operations of the method 1700 may be performed by a first device as described with reference to FIGS. 1 through 11. In some examples, a first device may execute a set of instructions to control the functional elements of the first device to perform the described functions. Additionally or alternatively, the first device may perform aspects of the described functions using special-purpose hardware.

At 1705, the method may include transmitting, to the second device, one or more reference signals corresponding to the set of multiple OAM modes. The operations of 1705 may be performed in accordance with examples as disclosed herein. In some examples, aspects of the operations of 1705 may be performed by a reference signal transmission component 1035 as described with reference to FIG. 10.

At 1710, the method may include receiving, from the second device, a second message indicating a respective index and a respective channel status for one or more OAM modes of a set of multiple OAM modes based on the one or more reference signals. The operations of 1710 may be performed in accordance with examples as disclosed herein. In some examples, aspects of the operations of 1710 may be performed by a message reception component 1040 as described with reference to FIG. 10.

At 1715, the method may include receiving, within the second message, an indication of a relationship between each OAM mode and one or more rings of a UCA panel. The operations of 1715 may be performed in accordance with examples as disclosed herein. In some examples, aspects of the operations of 1715 may be performed by a ring-mode reception component 1065 as described with reference to FIG. 10.

At 1720, the method may include selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The operations of 1720 may be performed in accordance with examples as disclosed herein. In some examples, aspects of the operations of 1720 may be performed by a OAM selection component 1025 as described with reference to FIG. 10.

At 1725, the method may include transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting. The operations of 1725 may be performed in accordance with examples as disclosed herein. In some examples, aspects of the operations of 1725 may be performed by a configuration transmission component 1030 as described with reference to FIG. 10.

FIG. 18 shows a flowchart illustrating a method 1800 that supports multimode DRX in OAM communications in accordance with aspects of the present disclosure. The operations of the method 1800 may be implemented by a first device or its components as described herein. For example, the operations of the method 1800 may be performed by a first device as described with reference to FIGS. 1 through 11. In some examples, a first device may execute a set of instructions to control the functional elements of the first device to perform the described functions. Additionally or alternatively, the first device may perform aspects of the described functions using special-purpose hardware.

At 1805, the method may include selecting, from a set of multiple OAM modes, a set of one or more primary OAM modes and a set of one or more secondary OAM modes, where at least one primary OAM mode from the set of one or more primary OAM modes is activated periodically and at least one secondary OAM mode from the set of one or more secondary OAM modes is activated based on a trigger. The operations of 1805 may be performed in accordance with examples as disclosed herein. In some examples, aspects of the operations of 1805 may be performed by a OAM selection component 1025 as described with reference to FIG. 10.

At 1810, the method may include transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based on the selecting. The operations of 1810 may be performed in accordance with examples as disclosed herein. In some examples, aspects of the operations of 1810 may be performed by a configuration transmission component 1030 as described with reference to FIG. 10.

At 1815, the method may include receiving, from the second device, an indication of a preparation duration for the at least one secondary OAM mode from the set of one or more secondary OAM modes. The operations of 1815 may be performed in accordance with examples as disclosed herein. In some examples, aspects of the operations of 1815 may be performed by a preparation duration indication component 1055 as described with reference to FIG. 10.

At 1820, the method may include transmitting data to the second device based on the preparation duration, the selected set of one or more primary OAM modes, the selected set of one or more secondary OAM modes, and the DRX parameters for each of the set of one or more primary OAM modes and the set of one or more secondary OAM modes. The operations of 1820 may be performed in accordance with examples as disclosed herein. In some examples, aspects of the operations of 1820 may be performed by a data transmission component 1060 as described with reference to FIG. 10.

FIG. 19 shows a flowchart illustrating a method 1900 that supports multimode DRX in OAM communications in accordance with aspects of the present disclosure. The operations of the method 1900 may be implemented by a second device or its components as described herein. For example, the operations of the method 1900 may be performed by a second device as described with reference to FIGS. 1 through 7 and 12 through 15. In some examples, a second device may execute a set of instructions to control the functional elements of the second device to perform the described functions. Additionally or alternatively, the second device may perform aspects of the described functions using special-purpose hardware.

At 1905, the method may include receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger. The operations of 1905 may be performed in accordance with examples as disclosed herein. In some examples, aspects of the operations of 1905 may be performed by a configuration reception component 1425 as described with reference to FIG. 14.

At 1910, the method may include monitoring for a signal using the at least one primary OAM mode in accordance with the DRX parameters for the set of one or more primary OAM modes. The operations of 1910 may be performed in accordance with examples as disclosed herein. In some examples, aspects of the operations of 1910 may be performed by a signal monitoring component 1430 as described with reference to FIG. 14.

FIG. 20 shows a flowchart illustrating a method 2000 that supports multimode DRX in OAM communications in accordance with aspects of the present disclosure. The operations of the method 2000 may be implemented by a second device or its components as described herein. For example, the operations of the method 2000 may be performed by a second device as described with reference to FIGS. 1 through 7 and 12 through 15. In some examples, a second device may execute a set of instructions to control the functional elements of the second device to perform the described functions. Additionally or alternatively, the second device may perform aspects of the described functions using special-purpose hardware.

At 2005, the method may include receiving, from a second device, a first message indicating a configuration a set of one or more primary OAM modes from a set of multiple OAM modes, a set of one or more secondary OAM modes from the set of multiple OAM modes, and DRX parameters for each of the set of one or more primary OAM modes and the set of one or more secondary OAM modes, where at least one primary OAM mode from the set of one or more primary OAM modes is activated periodically and at least one secondary OAM mode from the set of one or more secondary OAM modes is activated based on a trigger. The operations of 2005 may be performed in accordance with examples as disclosed herein. In some examples, aspects of the operations of 2005 may be performed by a configuration reception component 1425 as described with reference to FIG. 14.

At 2010, the method may include monitoring for a signal using the at least one primary OAM mode in accordance with the DRX parameters for the set of one or more primary OAM modes. The operations of 2010 may be performed in accordance with examples as disclosed herein. In some examples, aspects of the operations of 2010 may be performed by a signal monitoring component 1430 as described with reference to FIG. 14.

At 2015, the method may include receiving the signal from the second device based on the monitoring using the at least one primary OAM mode, the received signal indicating scheduled data for the at least one secondary OAM mode. The operations of 2015 may be performed in accordance with examples as disclosed herein. In some examples, aspects of the operations of 2015 may be performed by a signal reception component 1435 as described with reference to FIG. 14.

At 2020, the method may include activating the at least one secondary OAM mode from the set of one or more secondary OAM modes based on the received signal, where the scheduled data for the at least one secondary OAM mode includes the trigger. The operations of 2020 may be performed in accordance with examples as disclosed herein. In some examples, aspects of the operations of 2020 may be performed by a OAM mode activation component 1440 as described with reference to FIG. 14. The following provides an overview of aspects of the present disclosure:

Aspect 1: A method for wireless communication at a first device, comprising: selecting, from a plurality of OAM modes, a set of one or more primary OAM modes and a set of one or more secondary OAM modes, wherein at least one primary OAM mode from the set of one or more primary OAM modes is activated periodically and at least one secondary OAM mode from the set of one or more secondary OAM modes is activated based at least in part on a trigger; and transmitting, to a second device, a first message indicating a configuration for the selected set of one or more primary OAM modes, the selected set of one or more secondary OAM modes, and DRX parameters for each of the set of one or more primary OAM modes and the set of one or more secondary OAM modes based at least in part on the selecting.

Aspect 2: The method of aspect 1, further comprising: transmitting, to the second device, one or more reference signals corresponding to the plurality of OAM modes; and receiving, from the second device, a second message indicating a respective index and a respective channel status for one or more OAM modes of the plurality of OAM modes based at least in part on the one or more reference signals, wherein selecting the set of one or more primary OAM modes and the set of one or more secondary OAM modes is based at least in part on the second message.

Aspect 3: The method of aspect 2, further comprising: receiving, within the second message, an indication of a relationship between each OAM mode and one or more rings of a UCA panel, wherein selecting the set of one or more primary OAM modes and the set of one or more secondary OAM modes is based at least in part on the indication of the relationship.

Aspect 4: The method of aspect 3, wherein selecting the set of one or more primary OAM modes and the set of one or more secondary OAM modes comprises: selecting a first primary OAM mode corresponding to a first ring of the one or more rings based at least in part on the relationship between each OAM mode and the one or more rings of the UCA panel: selecting a second primary OAM mode corresponding to a second ring of the one or more rings based at least in part on the relationship between each OAM mode and the one or more rings of the UCA panel, the second ring being different from the first ring: selecting a first subset of one or more secondary OAM modes that corresponds to the first ring of the one or more rings based at least in part on the relationship between each OAM mode and the one or more rings of the UCA panel; and selecting a second subset of one or more secondary OAM mode corresponding to the second ring of the one or more rings based at least in part on the relationship between each OAM mode and the one or more rings of the UCA panel.

Aspect 5: The method of any of aspects 1 through 4, further comprising: determining, for each primary OAM mode of the set of one or more primary OAM modes, a start position of an on-duration, a length of the on-duration, and a length of an inactivity timer, wherein the DRX parameters for the set of one or more primary OAM modes comprise the start position of the on-duration, the length of the on-duration, and the length of the inactivity timer.

Aspect 6: The method of aspect 5, wherein the on-duration corresponds to a time period during which the at least one primary OAM mode from the set of one or more primary OAM modes is activated in accordance with a DRX cycle, and wherein the inactivity timer corresponds to a time duration after which the at least one primary OAM mode from the set of one or more primary OAM modes is deactivated based at least in part on an absence of signaling.

Aspect 7: The method of aspect 6, wherein the inactivity timer for the set of one or more primary OAM modes is greater than an inactivity timer for the set of one or more secondary OAM modes.

Aspect 8: The method of any of aspects 6 through 7, wherein the inactivity timer corresponds to a time duration after which the at least one secondary OAM mode from the set of one or more secondary OAM modes is deactivated based at least in part on the absence of signaling.

Aspect 9: The method of any of aspects 1 through 8, further comprising: determining a length of an inactivity timer for each secondary OAM mode of the set of one or more secondary OAM modes, wherein the DRX parameters for the set of one or more secondary OAM modes comprise the length of the inactivity timer.

Aspect 10: The method of any of aspects 1 through 9, further comprising: receiving, from the second device, an indication of a preparation duration for the at least one secondary OAM mode from the set of one or more secondary OAM modes; and transmitting data to the second device based at least in part on the preparation duration, the selected set of one or more primary OAM modes, the selected set of one or more secondary OAM modes, and the DRX parameters for each of the set of one or more primary OAM modes and the set of one or more secondary OAM modes.

Aspect 11: A method for wireless communication at a first device, comprising: receiving, from a second device, a first message indicating a configuration a set of one or more primary OAM modes from a plurality of OAM modes, a set of one or more secondary OAM modes from the plurality of OAM modes, and DRX parameters for each of the set of one or more primary OAM modes and the set of one or more secondary OAM modes, wherein at least one primary OAM mode from the set of one or more primary OAM modes is activated periodically and at least one secondary OAM mode from the set of one or more secondary OAM modes is activated based at least in part on a trigger; and monitoring for a signal using the at least one primary OAM mode in accordance with the DRX parameters for the set of one or more primary OAM modes.

Aspect 12: The method of aspect 11, further comprising: receiving the signal from the second device based at least in part on the monitoring using the at least one primary OAM mode, the received signal indicating scheduled data for the at least one secondary OAM mode; and activating the at least one secondary OAM mode from the set of one or more secondary OAM modes based at least in part on the received signal, wherein the scheduled data for the at least one secondary OAM mode comprises the trigger.

Aspect 13: The method of any of aspects 11 through 12, further comprising: receiving, from the second device, one or more reference signals corresponding to the plurality of OAM modes: determining, based at least in part on a measurement of the one or more reference signals, a respective index and a respective channel status for one or more OAM modes of the plurality of OAM modes; and transmitting, to the second device, a second message indicating the respective index and the respective channel status for the one or more OAM modes, wherein the set of one or more primary OAM modes and the set of one or more secondary OAM modes are based at least in part on the second message.

Aspect 14: The method of aspect 13, further comprising: determining a relationship between each OAM mode and one or more rings of a UCA panel; and transmitting, within the second message, an indication of the relationship between each OAM mode and the one or more rings of the UCA panel, wherein the set of one or more primary OAM modes and the set of one or more secondary OAM modes are based at least in part on the relationship.

Aspect 15: The method of aspect 14, wherein the set of one or more primary OAM modes comprises a first primary OAM mode corresponding to a first ring of the one or more rings and a second primary OAM mode corresponding to a second ring of the one or more rings, the second ring being different from the first ring, and wherein the first primary OAM mode and the second primary OAM mode are based at least in part on the relationship between each OAM mode and the one or more rings of the UCA panel.

Aspect 16: The method of any of aspects 14 through 15, wherein the set of one or more secondary OAM modes comprises a first subset of secondary OAM modes corresponding to a first ring of the one or more rings and a second subset of secondary OAM modes corresponding to a second ring of the one or more rings, the second ring being different from the first ring, and wherein the first subset of secondary OAM modes and the second subset of secondary OAM modes are based at least in part on the relationship between each OAM mode and the one or more rings of the UCA panel.

Aspect 17: The method of any of aspects 11 through 16, wherein the DRX parameters for the set of one or more primary OAM modes comprise a start position of an on-duration, a length of the on-duration, a length of an inactivity timer, or any combination thereof.

Aspect 18: The method of aspect 17, wherein the on-duration corresponds to a time period during which the at least one primary OAM mode is activated in accordance with a DRX cycle, and wherein the inactivity timer corresponds to a time duration after which the at least one primary OAM mode is deactivated based at least in part on an absence of signaling.

Aspect 19: The method of any of aspects 17 through 18, wherein monitoring for the signal using the at least one primary OAM mode comprises: monitoring for the signal based at least in part on the on-duration and the length of the on-duration; and starting the inactivity timer for the at least one primary OAM mode based at least in part on receiving the signal from the second device.

Aspect 20: The method of aspect 19, further comprising: receiving data from the second device using the at least one secondary OAM mode based at least in part on receiving the signal from the second device; and starting an inactivity timer for the at least one secondary OAM mode based at least in part on receiving the data from the second device.

Aspect 21: The method of aspect 20, wherein the inactivity timer for the at least one primary OAM mode is greater than the inactivity timer for the at least one secondary OAM mode.

Aspect 22: The method of any of aspects 19 through 21, further comprising: deactivating the at least one primary OAM mode from the set of one or more primary OAM modes, the at least one secondary OAM mode from the set of one or more secondary OAM modes, or both based at least in part on an expiration of the on-duration for the at least one primary OAM mode, an expiration of the inactivity timer for the at least one secondary OAM mode, or both.

Aspect 23: The method of any of aspects 11 through 22, wherein the DRX parameters for the set of one or more secondary OAM modes comprise a length of an inactivity timer.

Aspect 24: The method of aspect 23, wherein the inactivity timer corresponds to a time duration after which the at least one secondary OAM mode from the set of one or more secondary OAM modes is deactivated based at least in part on an absence of signaling.

Aspect 25: The method of any of aspects 11 through 24, further comprising: transmitting, to the second device, an indication of a preparation duration for the at least one secondary OAM mode from the set of one or more secondary OAM modes; and activating the at least one secondary OAM mode from the set of one or more secondary OAM modes in accordance with the preparation duration.

Aspect 26: An apparatus for wireless communication at a first device, comprising a memory and a processor coupled to the memory and configured to cause the apparatus to perform a method of any of aspects 1 through 10.

Aspect 27: An apparatus for wireless communication at a first device, comprising at least one means for performing a method of any of aspects 1 through 10.

Aspect 28: A non-transitory computer-readable medium storing code for wireless communication at a first device, the code comprising instructions executable by a processor to perform a method of any of aspects 1 through 10.

Aspect 29: An apparatus for wireless communication at a first device, comprising a memory and a processor coupled to the memory and configured to cause the apparatus to perform a method of any of aspects 11 through 25.

Aspect 30: An apparatus for wireless communication at a first device, comprising at least one means for performing a method of any of aspects 11 through 25.

Aspect 31: A non-transitory computer-readable medium storing code for wireless communication at a first device, the code comprising instructions executable by a processor to perform a method of any of aspects 11 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
  a memory; and
  a processor coupled to the memory and configured to:
    select, from a plurality of orbital angular momentum modes, a set of one or more primary orbital angular momentum modes and a set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger; and
    transmit, to a second device, a first message indicating a configuration for the selected set of one or more primary orbital angular momentum modes, the selected set of one or more secondary orbital angular momentum modes, and discontinuous reception parameters for each of the set of one or more primary orbital angular momentum modes and the set of one or more secondary orbital angular momentum modes based at least in part on the selecting.

2. The apparatus of claim 1, wherein the processor is further configured to:
  transmit, to the second device, one or more reference signals corresponding to the plurality of orbital angular momentum modes; and
  receive, from the second device, a second message indicating a respective index and a respective channel status for one or more orbital angular momentum modes of the plurality of orbital angular momentum modes based at least in part on the one or more reference signals, wherein selecting the set of one or more primary orbital angular momentum modes and the set of one or more secondary orbital angular momentum modes is based at least in part on the second message.

3. The apparatus of claim 2, wherein the processor is further configured to:
  receive, within the second message, an indication of a relationship between each orbital angular momentum mode and one or more rings of a uniform circular array panel, wherein selecting the set of one or more primary orbital angular momentum modes and the set of one or more secondary orbital angular momentum modes is based at least in part on the indication of the relationship.

4. The apparatus of claim 3, wherein the processor being configured to select the set of one or more primary orbital angular momentum modes and the set of one or more secondary orbital angular momentum modes is further configured to:
  select a first primary orbital angular momentum mode corresponding to a first ring of the one or more rings based at least in part on the relationship between each orbital angular momentum mode and the one or more rings of the uniform circular array panel;

select a second primary orbital angular momentum mode corresponding to a second ring of the one or more rings based at least in part on the relationship between each orbital angular momentum mode and the one or more rings of the uniform circular array panel, the second ring being different from the first ring;

select a first subset of one or more secondary orbital angular momentum modes that corresponds to the first ring of the one or more rings based at least in part on the relationship between each orbital angular momentum mode and the one or more rings of the uniform circular array panel; and select a second subset of one or more secondary orbital angular momentum mode corresponding to the second ring of the one or more rings based at least in part on the relationship between each orbital angular momentum mode and the one or more rings of the uniform circular array panel.

5. The apparatus of claim 1, wherein the processor is further configured to:

determine, for each primary orbital angular momentum mode of the set of one or more primary orbital angular momentum modes, a start position of an on-duration, a length of the on-duration, and a length of an inactivity timer, wherein the discontinuous reception parameters for the set of one or more primary orbital angular momentum modes comprise the start position of the on-duration, the length of the on-duration, and the length of the inactivity timer.

6. The apparatus of claim 5, wherein the on-duration corresponds to a time period during which the at least one primary orbital angular momentum mode from the set of one or more primary orbital angular momentum modes is activated in accordance with a discontinuous reception cycle, and wherein the inactivity timer corresponds to a time duration after which the at least one primary orbital angular momentum mode from the set of one or more primary orbital angular momentum modes is deactivated based at least in part on an absence of signaling.

7. The apparatus of claim 6, wherein the inactivity timer for the set of one or more primary orbital angular momentum modes is greater than an inactivity timer for the set of one or more secondary orbital angular momentum modes.

8. The apparatus of claim 6, wherein the inactivity timer corresponds to a time duration after which the at least one secondary orbital angular momentum mode from the set of one or more secondary orbital angular momentum modes is deactivated based at least in part on the absence of signaling.

9. The apparatus of claim 1, wherein the processor is further configured to:

determine a length of an inactivity timer for each secondary orbital angular momentum mode of the set of one or more secondary orbital angular momentum modes, wherein the discontinuous reception parameters for the set of one or more secondary orbital angular momentum modes comprise the length of the inactivity timer.

10. The apparatus of claim 1, wherein the processor is further configured to:

receive, from the second device, an indication of a preparation duration for the at least one secondary orbital angular momentum mode from the set of one or more secondary orbital angular momentum modes; and transmit data to the second device based at least in part on the preparation duration, the selected set of one or more primary orbital angular momentum modes, the selected set of one or more secondary orbital angular momentum modes, and the discontinuous reception parameters for each of the set of one or more primary orbital angular momentum modes and the set of one or more secondary orbital angular momentum modes.

11. An apparatus for wireless communication at a first device, comprising:

a memory; and a processor coupled to the memory and configured to:

receive, from a second device, a first message indicating a configuration a set of one or more primary orbital angular momentum modes from a plurality of orbital angular momentum modes, a set of one or more secondary orbital angular momentum modes from the plurality of orbital angular momentum modes, and discontinuous reception parameters for each of the set of one or more primary orbital angular momentum modes and the set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger; and monitor for a signal using the at least one primary orbital angular momentum mode in accordance with the discontinuous reception parameters for the set of one or more primary orbital angular momentum modes.

12. The apparatus of claim 11, wherein the processor is further configured to:

receive the signal from the second device based at least in part on the monitoring using the at least one primary orbital angular momentum mode, the received signal indicating scheduled data for the at least one secondary orbital angular momentum mode; and activate the at least one secondary orbital angular momentum mode from the set of one or more secondary orbital angular momentum modes based at least in part on the received signal, wherein the scheduled data for the at least one secondary orbital angular momentum mode comprises the trigger.

13. The apparatus of claim 11, wherein the processor is further configured to:

receive, from the second device, one or more reference signals corresponding to the plurality of orbital angular momentum modes;

determine, based at least in part on a measurement of the one or more reference signals, a respective index and a respective channel status for one or more orbital angular momentum modes of the plurality of orbital angular momentum modes; and transmit, to the second device, a second message indicating the respective index and the respective channel status for the one or more orbital angular momentum modes, wherein the set of one or more primary orbital angular momentum modes and the set of one or more secondary orbital angular momentum modes are based at least in part on the second message.

14. The apparatus of claim 13, wherein the processor is further configured to:

determine a relationship between each orbital angular momentum mode and one or more rings of a uniform circular array panel; and

transmit, within the second message, an indication of the relationship between each orbital angular momentum mode and the one or more rings of the uniform circular array panel, wherein the set of one or more primary orbital angular momentum modes and the set of one or more secondary orbital angular momentum modes are based at least in part on the relationship.

15. The apparatus of claim 14, wherein the set of one or more primary orbital angular momentum modes comprises a first primary orbital angular momentum mode corresponding to a first ring of the one or more rings and a second primary orbital angular momentum mode corresponding to a second ring of the one or more rings, the second ring being different from the first ring, and wherein the first primary orbital angular momentum mode and the second primary orbital angular momentum mode are based at least in part on the relationship between each orbital angular momentum mode and the one or more rings of the uniform circular array panel.

16. The apparatus of claim 14, wherein the set of one or more secondary orbital angular momentum modes comprises a first subset of secondary orbital angular momentum modes corresponding to a first ring of the one or more rings and a second subset of secondary orbital angular momentum modes corresponding to a second ring of the one or more rings, the second ring being different from the first ring, and wherein the first subset of secondary orbital angular momentum modes and the second subset of secondary orbital angular momentum modes are based at least in part on the relationship between each orbital angular momentum mode and the one or more rings of the uniform circular array panel.

17. The apparatus of claim 11, wherein the discontinuous reception parameters for the set of one or more primary orbital angular momentum modes comprise a start position of an on-duration, a length of the on-duration, a length of an inactivity timer, or any combination thereof.

18. The apparatus of claim 17, wherein the on-duration corresponds to a time period during which the at least one primary orbital angular momentum mode is activated in accordance with a discontinuous reception cycle, and wherein the inactivity timer corresponds to a time duration after which the at least one primary orbital angular momentum mode is deactivated based at least in part on an absence of signaling.

19. The apparatus of claim 17, wherein the processor being configured to monitor for the signal using the at least one primary orbital angular momentum mode is further configured to:

monitor for the signal based at least in part on the on-duration and the length of the on-duration; and
start the inactivity timer for the at least one primary orbital angular momentum mode based at least in part on receiving the signal from the second device.

20. The apparatus of claim 19, wherein the processor is further configured to:

receive data from the second device using the at least one secondary orbital angular momentum mode based at least in part on receiving the signal from the second device; and
start an inactivity timer for the at least one secondary orbital angular momentum mode based at least in part on receiving the data from the second device.

21. The apparatus of claim 20, wherein the inactivity timer for the at least one primary orbital angular momentum mode is greater than the inactivity timer for the at least one secondary orbital angular momentum mode.

22. The apparatus of claim 19, wherein the processor is further configured to:

deactivate the at least one primary orbital angular momentum mode from the set of one or more primary orbital angular momentum modes, the at least one secondary orbital angular momentum mode from the set of one or more secondary orbital angular momentum modes, or both based at least in part on an expiration of the on-duration for the at least one primary orbital angular momentum mode, an expiration of the inactivity timer for the at least one secondary orbital angular momentum mode, or both.

23. The apparatus of claim 11, wherein the discontinuous reception parameters for the set of one or more secondary orbital angular momentum modes comprise a length of an inactivity timer.

24. The apparatus of claim 23, wherein the inactivity timer corresponds to a time duration after which the at least one secondary orbital angular momentum mode from the set of one or more secondary orbital angular momentum modes is deactivated based at 3 least in part on an absence of signaling.

25. The apparatus of claim 11, wherein the processor is further configured to:

transmit, to the second device, an indication of a preparation duration for the at least one secondary orbital angular momentum mode from the set of one or more secondary orbital angular momentum modes; and
activate the at least one secondary orbital angular momentum mode from the set of one or more secondary orbital angular momentum modes in accordance with the preparation duration.

26. A method for wireless communication at a first device, comprising:

selecting, from a plurality of orbital angular momentum modes, a set of one or more primary orbital angular momentum modes and a set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger; and
transmitting, to a second device, a first message indicating a configuration for the selected set of one or more primary orbital angular momentum modes, the selected set of one or more secondary orbital angular momentum modes, and discontinuous reception 11 parameters for each of the set of one or more primary orbital angular momentum modes and the set of one or more secondary orbital angular momentum modes based at least in part on the selecting.

27. The method of claim 26, further comprising:

transmitting, to the second device, one or more reference signals corresponding to the plurality of orbital angular momentum modes; and
receiving, from the second device, a second message indicating a respective index and a respective channel status for one or more orbital angular momentum modes of the plurality of orbital angular momentum modes based at least in part on the one or more reference signals, wherein selecting the set of one or more primary orbital angular momentum modes and the set of one or more secondary orbital angular momentum modes is based at least in part on the second message.

28. The method of claim 27, further comprising:

receiving, within the second message, an indication of a relationship between each orbital angular momentum mode and one or more rings of a uniform circular array panel, wherein selecting the set of one or more primary orbital angular momentum modes and the set of one or more secondary orbital angular momentum modes is based at least in part on the indication of the relationship.

29. A method for wireless communication at a first device, comprising:

receiving, from a second device, a first message indicating a configuration a set of one or more primary orbital angular momentum modes from a plurality of orbital angular momentum modes, a set of one or more secondary orbital angular momentum modes from the plurality of orbital angular momentum modes, and discontinuous reception parameters for each of the set of one or more primary orbital angular momentum modes and the set of one or more secondary orbital angular momentum modes, wherein at least one primary orbital angular momentum mode from the set of one or more primary orbital angular momentum modes is activated periodically and at least one secondary orbital angular momentum mode from the set of one or more secondary orbital angular momentum modes is activated based at least in part on a trigger; and monitoring for a signal using the at least one primary orbital angular momentum mode in accordance with the discontinuous reception parameters for the set of one or more primary orbital angular momentum modes.

30. The method of claim 29, further comprising:

receiving the signal from the second device based at least in part on the monitoring using the at least one primary orbital angular momentum mode, the received signal indicating scheduled data for the at least one secondary orbital angular momentum mode; and activating the at least one secondary orbital angular momentum mode from the set of one or more secondary orbital angular momentum modes based at least in part on the received signal, wherein the scheduled data for the at least one secondary orbital angular momentum mode comprises the trigger.

* * * * *